United States Patent
Harada

(10) Patent No.: US 9,798,141 B2
(45) Date of Patent: Oct. 24, 2017

(54) HEAD-UP DISPLAY

(71) Applicant: FUJIFILM Corporation, Tokyo (JP)

(72) Inventor: Keisuke Harada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/246,864

(22) Filed: Aug. 25, 2016

(65) Prior Publication Data

US 2017/0090193 A1    Mar. 30, 2017

(30) Foreign Application Priority Data

Sep. 29, 2015  (JP) ................. 2015-191343

(51) Int. Cl.
  *G02B 27/14* (2006.01)
  *G02B 27/01* (2006.01)
  *G02B 5/02* (2006.01)

(52) U.S. Cl.
  CPC ....... *G02B 27/0101* (2013.01); *G02B 5/0278* (2013.01); *G02B 2027/015* (2013.01)

(58) Field of Classification Search
  CPC ............. G02B 27/0101; G02B 5/0278; G02B 27/0172; G02B 2027/011; G02B 2027/0178; G02B 27/017; G02B 2027/0132
  USPC ....................... 359/630, 631, 633
  See application file for complete search history.

(56) References Cited

U.S. PATENT DOCUMENTS 8,289,229 B2 * 10/2012 Ishikawa ............ G02B 27/0101
                                                            345/7
2007/0229394 A1   10/2007 Ishikawa et al.

FOREIGN PATENT DOCUMENTS

JP  H04-247489 A    9/1992
JP  2007-272061 A   10/2007

* cited by examiner

*Primary Examiner* — James Greece
(74) *Attorney, Agent, or Firm* — Studebaker & Brackett PC

(57) ABSTRACT

Disclosed is a head-up display capable of achieving reduction in size while securing an optical path length from an image display element to an image reflecting surface. In a head-up display, a reflection optical system has at least three or more mirrors including an l-th mirror, an m-th mirror, and an n-th mirror sequentially in this order from the image display element side along a light beam emitted from the image display element D, the n-th mirror has a refractive power and is arranged closest to the image reflecting surface side among all mirrors, the light beam emitted from the image display element D is reflected from the l-th mirror, the m-th mirror, and the n-th mirror in this order, the light beam emitted from the n-th mirror passes between the l-th mirror and the m-th mirror and reaches the image reflecting surface, and predetermined conditional expressions are further satisfied.

6 Claims, 17 Drawing Sheets

HEAD-UP DISPLAY

CROSS-REFERENCE TO RELATED APPLICATIONS

The present application claims priority under 35 U.S.C. §119 to Japanese Patent Application No. 2015-191343, filed on Sep. 29, 2015. Each of the above application(s) is hereby expressly incorporated by reference, in its entirety, into the present application.

BACKGROUND OF THE INVENTION

1. Field of the Invention

The present invention relates to a head-up display for a mobile object, such as an automobile.

2. Description of the Related Art

Hitherto, a head-up display has been known as a device which displays information of direction indication, alerting, a traveling speed, and the like to a driver of an automobile or the like. The head-up display projects a virtual image of an image to be displayed onto an image reflecting surface, such as a front window or a combiner, such that the driver can recognize information necessary for driving of the automobile or the like without having to move the eyes away from a field of view. Such a head-up display is suggested in JP1992-247489A (JP-H04-247489A) and JP2007-272061A.

SUMMARY OF THE INVENTION

Since a head-up display needs to be installed in a limited space around a driver's seat of a mobile object, such as an automobile, a head-up display is required to have a small size.

In order to reduce movement of the line of sight of the driver when confirming display information of the head-up display for safety or prevention of fatigue in the eyes of the driver, it is preferable that a focal position of a virtual image is as far from the driver as possible, and to this end, it is necessary to extend the optical path length from the image display element in the head-up display to the image reflecting surface; however, this is contradictory to the requirement for reduction in size of the device.

The invention has been accomplished in consideration of the above-described situation, and an object of the invention is to provide a head-up display capable of achieving reduction in size while securing the optical path length from an image display element to an image reflecting surface.

A head-up display of the invention comprises a reflection optical system which reflects display light from an image display element to an observer side on an image reflecting surface facing the observer, an image displayed on the image display element being enlarged and displayed as a virtual image over the image reflecting surface. The reflection optical system has at least three or more mirrors including an l-th mirror, an m-th mirror, and an n-th mirror sequentially in this order from the image display element side along a light beam emitted from the image display element, and the n-th mirror has a refractive power and is arranged closest to the image reflecting surface side along an optical path of the light beam among all mirrors, the light beam emitted from the image display element is reflected from the l-th mirror, the m-th mirror, and the n-th mirror in this order, and the light beam emitted from the n-th mirror passes between the l-th mirror and the m-th mirror and reaches the image reflecting surface, and conditional expressions (1) to (6) are satisfied.

$$0.18 < \beta \times H1/\alpha m < 0.33 \tag{1}$$

$$3.50 < \alpha m/(\alpha n \times \sin \theta n) < 5.00 \tag{2}$$

$$1.00 < \alpha m/(L^2 - (\alpha n \times \cos \theta n)^2)^{1/2} < 2.00 \tag{3}$$

$$\pi/36 < \theta n < \pi/9 \tag{4}$$

$$-\pi/15 < (\pi/2) - (2 \times \theta m + \theta n) < \pi/15 \tag{5}$$

$$-\pi/15 < (\pi/2) - (\theta l + \theta m + \theta n) < \pi/15 \tag{6}$$

In the conditional expressions, when a light beam emitted from a central position of the image display element in a direction perpendicular to a display surface of the image display element is a central light beam, an intersection point of the central light beam and the l-th mirror is Pl, an intersection point of the central light beam and the m-th mirror is Pm, an intersection point of the central light beam and the n-th mirror is Pn, and a plane including the intersection point Pl, the intersection point Pm, and the intersection point Pn is U, β: a paraxial magnification of the n-th mirror H1: the distance between the center and the end of a display region of the image display element in the plane U αm: the distance between the intersection point Pl and the intersection point Pm αn: the distance between the intersection point Pm and the intersection point Pn θl: an incidence angle or a reflection angle of the central light beam at the intersection point Pl θm: an incidence angle or a reflection angle of the central light beam at the intersection point Pm θn: an incidence angle or a reflection angle of the central light beam at the intersection point Pn L: the distance between the intersection point Pl and the intersection point Pn.

When An is the central optical path length from the central position of the image display element to the intersection point Pn, the paraxial magnification β of the n-th mirror is represented by the following expression.

$$\beta = |B/(-An)|$$

In the above-described expression, "B" is an image distance derived from the following expression when R is a paraxial curvature radius (a convex surface has a positive sign and a concave surface has a negative sign) of the n-th mirror.

$$(1/(-An)) + (1/B) = (2/R)$$

While the conditional expressions (1) to (6) are satisfied, it is preferable that one or a combination of multiple expressions of the following conditional expressions (1-1) to (6-1) are satisfied, and it is more preferable that one or a combination of multiple expressions of the following conditional expressions (1-2) to (6-2) are satisfied.

$$0.21 < \beta \times H1/\alpha m < 0.32 \tag{1-1}$$

$$0.22 < \beta \times H1/\alpha m < 0.30 \tag{1-2}$$

$$3.80 < \alpha m/(\alpha n \times \sin \theta n) < 4.50 \tag{2-1}$$

$$3.90 < \alpha m/(\alpha n \times \sin \theta n) < 4.30 \tag{2-2}$$

$$1.20 < \alpha m/(L^2 - (\alpha n \times \cos \theta n)^2)^{1/2} < 1.80 \tag{3-1}$$

$$1.25 < \alpha m/(L^2 - (\alpha n \times \cos \theta n)^2)^{1/2} < 1.70 \tag{3-2}$$

$$\pi/22 < \theta n < \pi/10 \tag{4-1}$$

$$\pi/20 < \theta n < \pi/11 \quad (4\text{-}2)$$

$$-\pi/18 < (\pi/2)-(2\times\theta m+\theta n) < \pi/18 \quad (5\text{-}1)$$

$$-\pi/22 < (\pi/2)-(2\times\theta m+\theta n) < \pi/22 \quad (5\text{-}2)$$

$$-\pi/18 < (\pi/2)-(\theta l+\theta m+\theta n) < \pi/18 \quad (6\text{-}1)$$

$$-\pi/22 < (\pi/2)-(\theta l+\theta m+\theta n) < \pi/22 \quad (6\text{-}2)$$

The head-up display of the invention may further comprise a diffusion member which diffuses and projects the light beam emitted from the image display element, the light beam emitted from the image display element being projected onto the image reflecting surface through the diffusion member, the light beam emitted from the image display element may pass through two adjacent mirrors from the image display element to the n-th mirror along the light beam emitted from the image display element, and a conditional expression (7) may be satisfied. In this case, it is more preferable that a conditional expression (7-1) and a conditional expression (7-2) are satisfied.

$$0.20 < 2\times H2/\alpha\tau < 0.40 \quad (7)$$

$$0.22 < 2\times H2/\alpha\tau < 0.38 \quad (7\text{-}1)$$

$$0.24 < 2\times H2/\alpha\tau < 0.36 \quad (7\text{-}2)$$

In the conditional expressions, when the two adjacent mirrors are a σ-th mirror and a τ-th mirror in this order from the image display element side, an intersection point of the central light beam and the σ-th mirror is Pσ, and an intersection point of the central light beam and the τ-th mirror is Pτ, H2: the distance between the center and the end of a display region of the diffusion member in the plane U ατ: the distance between the intersection point Pσ and the intersection point Pτ.

FIG. 10 is an explanatory view illustrating the contents indicated by the respective symbols in the conditional expression (1), FIG. 11 is an explanatory view illustrating the contents indicated by the respective symbols in the conditional expression (2), FIG. 12 is an explanatory view illustrating the contents indicated by the respective symbols in the conditional expression (3), FIG. 13 is an explanatory view illustrating the contents indicated by the respective symbols in the conditional expression (4), FIG. 14 is an explanatory view illustrating the contents indicated by the respective symbols in the conditional expression (5), FIG. 15 is an explanatory view illustrating the contents indicated by the respective symbols in the conditional expression (6), and FIG. 16 is an explanatory view illustrating the contents indicated by the respective symbols in the conditional expression (7).

FIGS. 10 to 16 show a state where the light beam emitted from a center O of an image display element D is reflected from an l-th mirror Ml, an m-th mirror Mm, and an n-th mirror Mn in this order, and the light beam emitted from the n-th mirror Mn passes between the l-th mirror Ml and the m-th mirror Mm and reaches the image reflecting surface (not shown). FIG. 16 shows a form in which a light beam emitted from an image display element included in a projection optical system S is once projected onto a diffusion member, such as diffuser.

In the respective conditional expressions, H, αm, αn, L, and ατ are in units of mm, and θl, θm, and θn are in units of rad (radians).

The head-up display of the invention bends the optical path of the light beam emitted from the image display element with at least three mirrors, and the arrangement positions or the arrangement angles of the three mirrors are configured to satisfy the following conditional expressions (1) to (6); thus, it is possible to provide a head-up display capable of achieving reduction in size while securing the optical path length from the image display element to the image reflecting surface.

$$0.18 < \beta \times H1/\alpha m < 0.33 \quad (1)$$

$$3.50 < \alpha m/(\alpha n \times \sin\theta n) < 5.00 \quad (2)$$

$$1.00 < \alpha m/(L^2-(\alpha n\times\cos\theta n)^2)^{1/2} < 2.00 \quad (3)$$

$$\pi/36 < \theta n < \pi/9 \quad (4)$$

$$-\pi/15 < (\pi/2)-(2\times\theta m+\theta n) < \pi/15 \quad (5)$$

$$-\pi/15 < (\pi/2)-(\theta l+\theta m+\theta n) < \pi/15 \quad (6)$$

DESCRIPTION OF THE PREFERRED EMBODIMENTS

Figure 1:
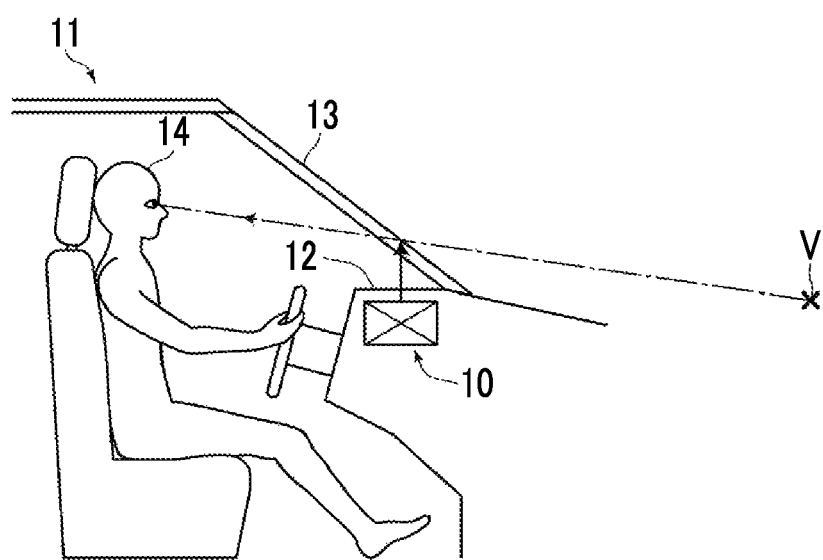
FIG. 1 is a schematic view of a driver's seat of an automobile in which a head-up display according to an embodiment of the invention is mounted.

Hereinafter, an embodiment of the invention will be described in detail referring to the drawings. FIG. 1 is a schematic view of a driver's seat of an automobile in which a head-up display according to an embodiment of the invention is mounted, and FIG. 2 is a schematic configuration diagram of the head-up display.

As shown in FIG. 1, a head-up display 10 of this embodiment is installed in a dashboard 12 of an automobile 11, and causes an image indicating information, such as a traveling speed, emitted from the inside of the device to be reflected from a front window (image reflecting surface) 13 and enlarges and displays the image as a virtual image V in front of a driver (observer) 14 over the front window 13.

Figure 2:
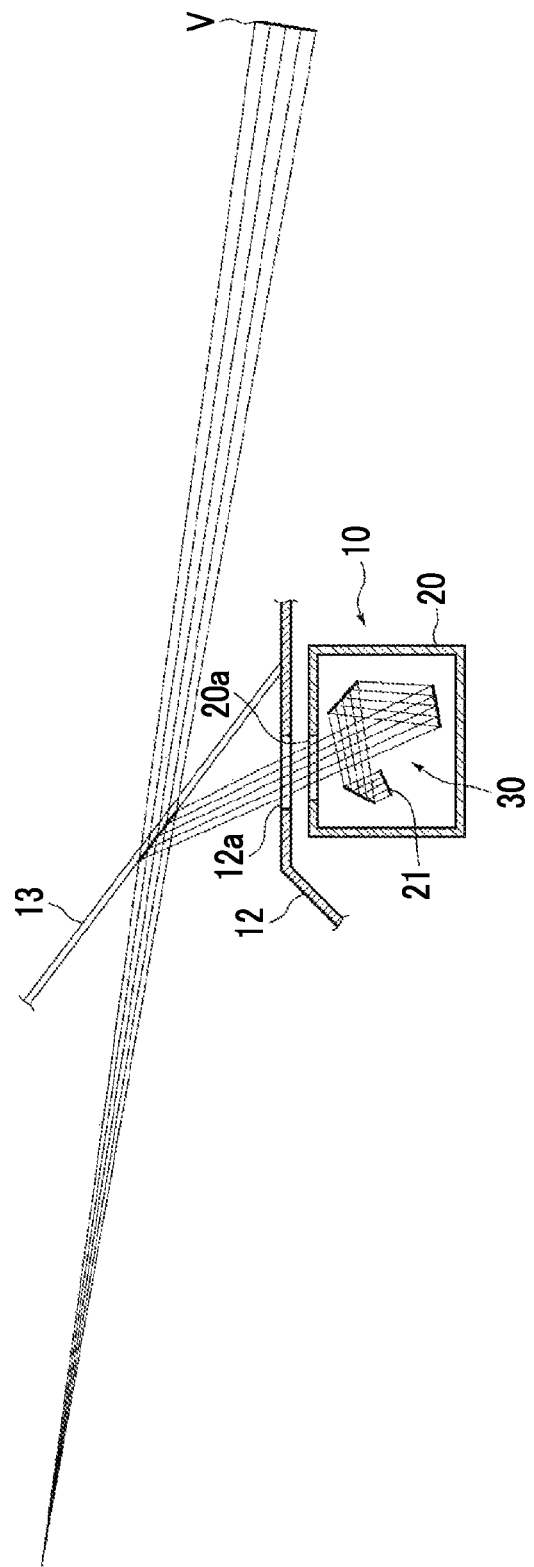
FIG. 2 is a schematic configuration diagram of the head-up display according to the embodiment of the invention.

As shown in FIG. 2, the head-up display 10 comprises, inside a housing 20, a reflection optical system 30 which reflects display light from an image display element 21 toward the driver 14 side. The housing 20 is provided with an opening 20a through which display light from the image display element 21 passes to the front window 13. Similarly, the dashboard 12 is provided with an opening 12a through which display light from the image display element 21 passes to the front window 13.

The reflection optical system 30 has at least three or more mirrors including an l-th mirror, an m-th mirror, and an n-th mirror sequentially in this order from the image display element 21 side along a light beam emitted from the image display element 21, the n-th mirror has a refractive power and is arranged closest to the front window (image reflecting surface) 13 along an optical path of the light beam among all mirrors, the light beam emitted from the image display element 21 is reflected from the l-th mirror, the m-th mirror, and the n-th mirror in this order, and the light beam emitted from the n-th mirror passes between the l-th mirror and the m-th mirror and reaches the image reflecting surface.

The arrangement positions or the arrangement angles of the three mirrors including the l-th mirror, the m-th mirror, and the n-th mirror are configured to satisfy the following conditional expressions (1) to (6).

$$0.18 < \beta \times H1/\alpha m < 0.33 \quad (1)$$

$$3.50 < \alpha m/(\alpha n \times \sin \theta n) < 5.00 \quad (2)$$

$$1.00 < \alpha m/(L^2 - (\alpha n \times \cos \theta n)^2)^{1/2} < 2.00 \quad (3)$$

$$\pi/36 < \theta n < \pi/9 \quad (4)$$

$$-\pi/15 < (\pi/2) - (2 \times \theta m + \theta n) < \pi/15 \quad (5)$$

$$-\pi/15 < (\pi/2) - (\theta l + \theta m + \theta n) < \pi/15 \quad (6)$$

In the conditional expressions, when a light beam emitted from a central position of the image display element in a direction perpendicular to a display surface of the image display element is a central light beam, an intersection point of the central light beam and the l-th mirror is Pl, an intersection point of the central light beam and the m-th mirror is Pm, an intersection point of the central light beam and the n-th mirror is Pn, and a plane including the intersection point Pl, the intersection point Pm, and the intersection point Pn is U, β: a paraxial magnification of the n-th mirror H1: the distance between the center and the end of a display region of the image display element in the plane U αm: the distance between the intersection point Pl and the intersection point Pm αn: the distance between the intersection point Pm and the intersection point Pn θl: an incidence angle or a reflection angle of the central light beam at the intersection point Pl θm: an incidence angle or a reflection angle of the central light beam at the intersection point Pm θn: an incidence angle or a reflection angle of the central light beam at the intersection point Pn L: the distance between the intersection point Pl and the intersection point Pn.

Figure 10:
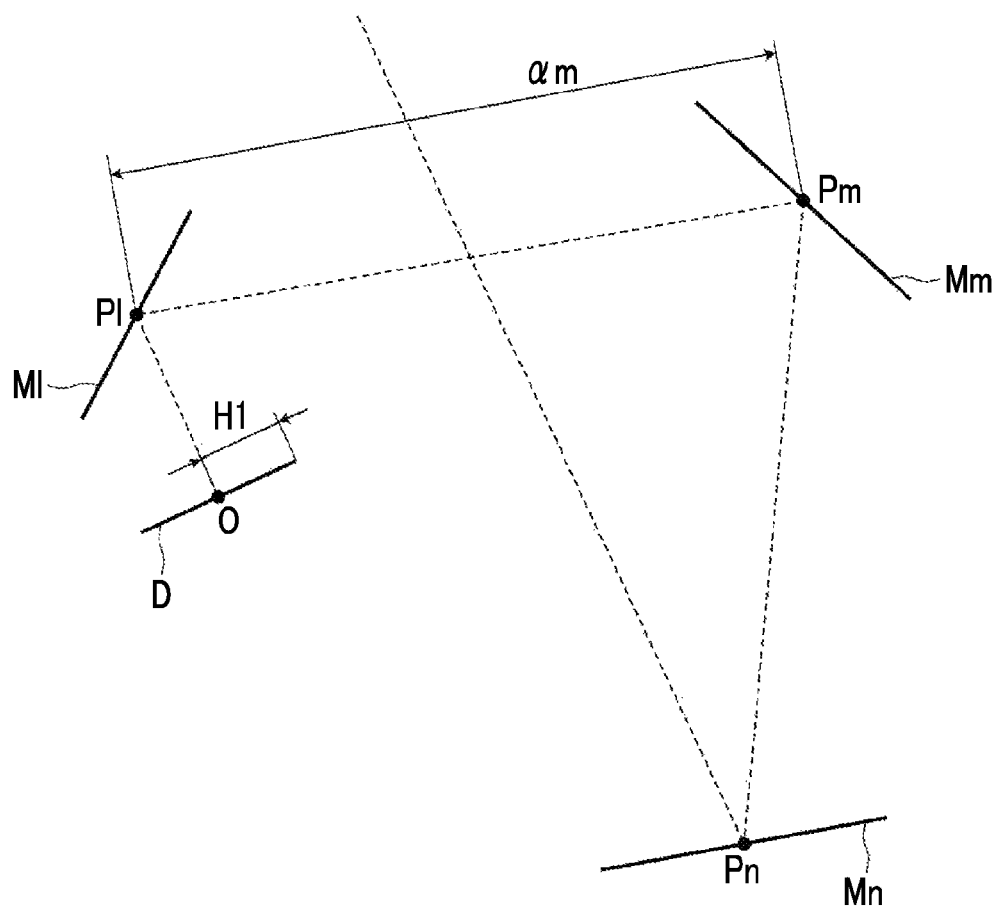
FIG. 10 is an explanatory view illustrating the contents indicated by the respective symbols in a conditional expression (1).

The conditional expression (1) will be described in detail. FIG. 10 is an explanatory view illustrating the contents indicated by the respective symbols in the conditional expression (1). The conditional expression (1) determines the range of the ratio of the interval between the l-th mirror Ml and the m-th mirror Mm to the height of the virtual image, and specifically, determines the interval between the l-th mirror Ml and the m-th mirror Mm according to an emitted light flux diameter corresponding to the height of the virtual image when the light beam emitted from the n-th mirror Mn passes between the l-th mirror Ml and the m-th mirror Mm while overlapping the light beam reflected from and passed through the l-th mirror Ml and the m-th mirror Mm without being shielded by the l-th mirror Ml and the m-th mirror Mm.

The expression of the conditional expression (1) is determined not to be equal to or less than a lower limit of the conditional expression (1), whereby it is possible to prevent the interval between the l-th mirror Ml and the m-th mirror Mm from being too large with respect to the emitted light flux diameter corresponding to the height of the virtual image; thus, it is possible to minimize a margin corresponding to the difference between the interval between the l-th mirror Ml and the m-th mirror Mm and the emitted light flux diameter while maintaining a state where the emitted light flux diameter is extremely large. Therefore, since it is possible to minimize the size of the openings 12a and 20a provided in the dashboard 12 and the housing 20, it is possible to suppress incidence of external light into the housing 20 or entrance of dust or tar of tobacco.

The expression of the conditional expression (1) is determined not to be equal to or greater than an upper limit of the conditional expression (1), whereby it is possible to prevent the interval between the l-th mirror Ml and the m-th mirror Mm from being too small with respect to the emitted light flux diameter corresponding to the height of the virtual image; thus, it is possible to prevent the light beam emitted from the n-th mirror Mn from being shielded by the l-th mirror Ml or the m-th mirror Mm.

Figure 11:
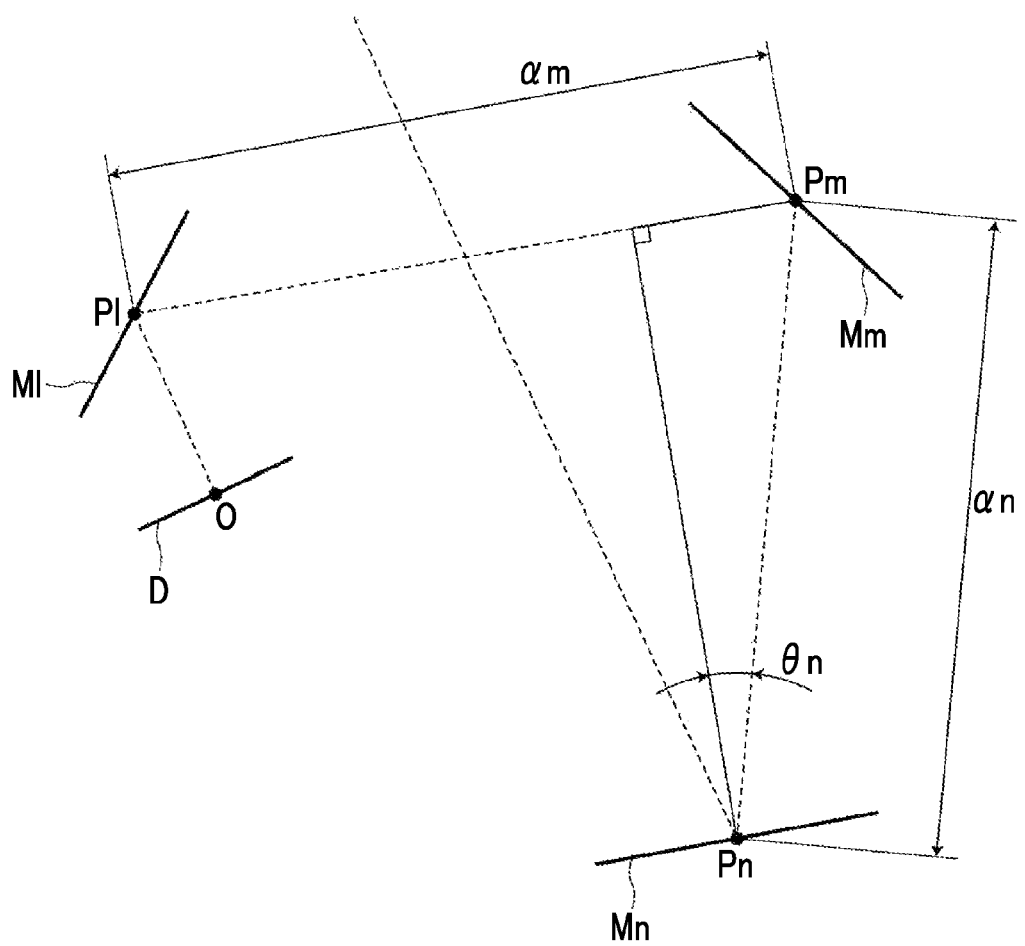
FIG. 11 is an explanatory view illustrating the contents indicated by the respective symbols in a conditional expression (2).
Figure 17:
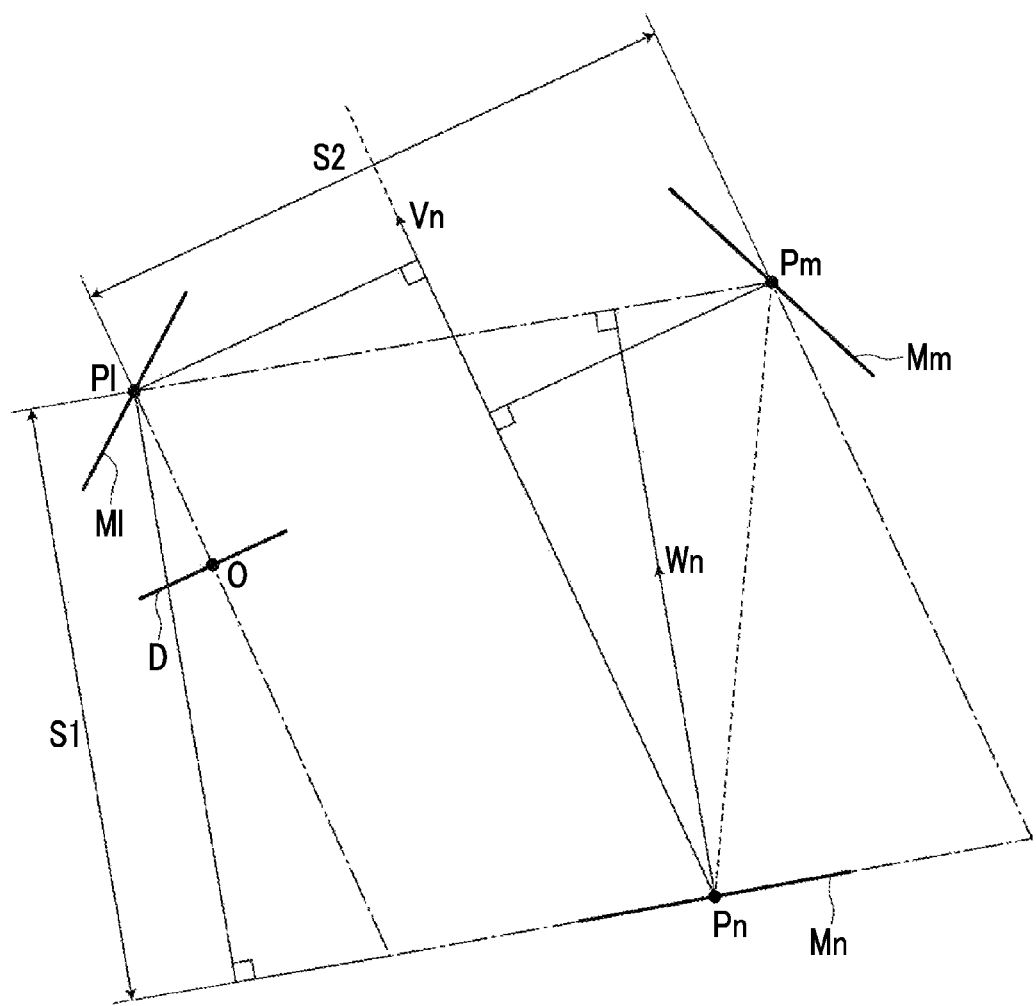
FIG. 17 is an explanatory view showing an arrangement form of respective components of the head-up display according to the embodiment of the invention.

Next, the conditional expression (2) will be described in detail. FIG. 11 is an explanatory view illustrating the contents indicated by the respective symbols in the conditional expression (2), and FIG. 17 is an explanatory view showing the arrangement form of respective components of the head-up display according to the embodiment of the invention. The conditional expression (2) determines the interval between the m-th mirror Mm and the n-th mirror Mn. The conditional expression (2) is satisfied, whereby it is possible to form an optical path along which the light beam emitted from the n-th mirror Mn passes through the vicinity of the center between the l-th mirror Ml and the m-th mirror Mm. With this, when the central optical path after being reflected from the n-th mirror Mn is defined as a vector Vn, it is possible to suppress the length (indicated by S2 in FIG. 17) in a direction perpendicular to the vector Vn in a mirror arrangement region of the reflection optical system; thus, it is possible to achieve reduction in size of the device.

The expression of the conditional expression (2) is determined not to be equal to or less than a lower limit of the conditional expression (2), whereby it is possible to prevent the light beam emitted from the n-th mirror Mn from excessively leaning against the l-th mirror Ml when passing between the l-th mirror Ml and the m-th mirror Mm; thus, it is possible to prevent the light beam from being shielded by the l-th mirror Ml. The expression of the conditional expression (2) is determined not to be equal to or greater than an upper limit of the conditional expression (2), whereby it is possible to prevent the light beam emitted from the n-th mirror Mn from excessively leaning against the m-th mirror Mm when passing between the l-th mirror Ml and the m-th mirror Mm; thus, it is possible to prevent the light beam from being shielded by the m-th mirror Mm.

Figure 12:
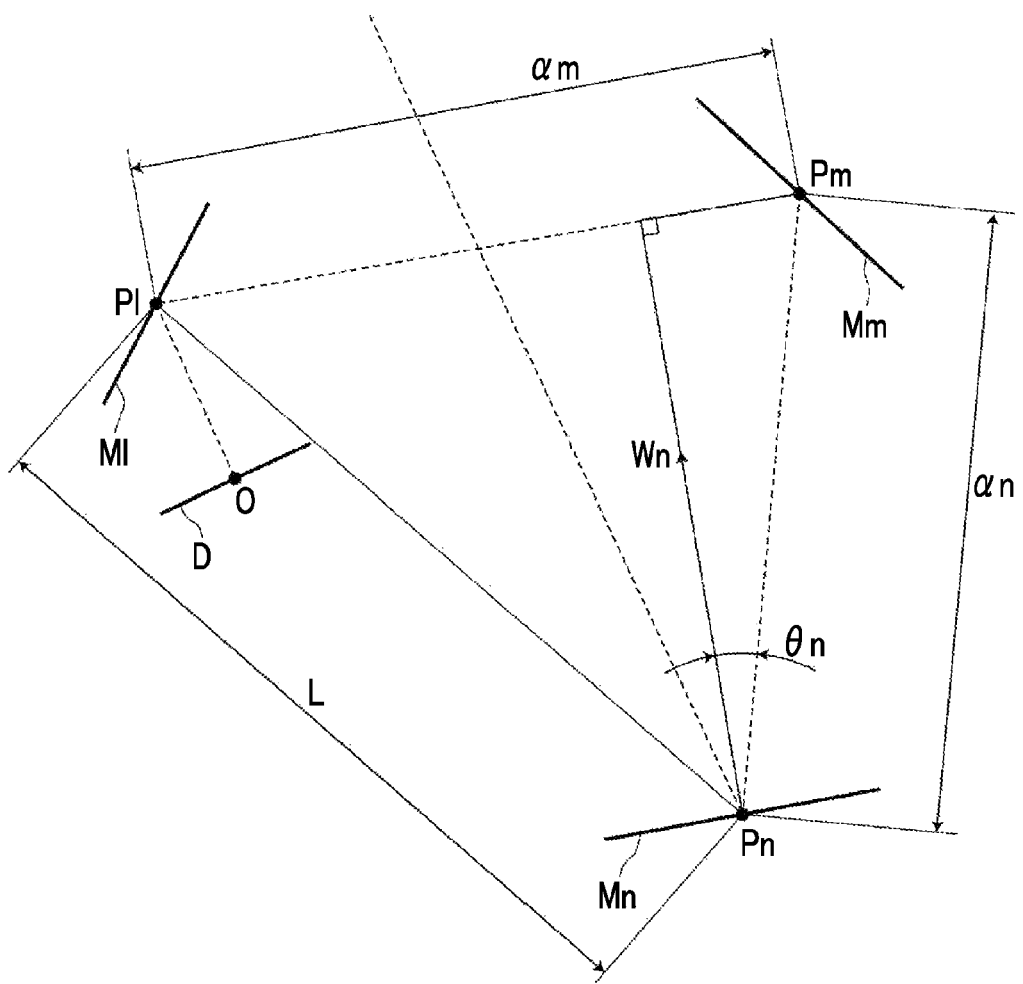
FIG. 12 is an explanatory view illustrating the contents indicated by the respective symbols in a conditional expression (3).

Next, the conditional expression (3) will be described in detail. FIG. 12 is an explanatory view illustrating the contents indicated by the respective symbols in the conditional expression (3). The conditional expression (3) determines the interval between the l-th mirror Ml and the n-th mirror Mn. The conditional expression (3) is satisfied, whereby it is possible to form an optical path in which a line connecting the intersection point Pl and the intersection point Pm is substantially perpendicular to a normal vector Wn of the n-th mirror Mn. With this, it is possible to minimize the length (indicated by S1 in FIG. 17) in a direction of the vector Wn in the mirror arrangement region of the reflection optical system; thus, it is possible to achieve reduction in size of the device.

The expression of the conditional expression (3) is determined not to be equal to or less than a lower limit of the conditional expression (3), whereby it is possible to prevent the interval between the l-th mirror Ml and the n-th mirror Mn from being too large; thus, it is possible to achieve reduction in size of the device. The expression of the conditional expression (3) is determined not to be equal to or greater than an upper limit of the conditional expression (3), whereby it is possible to prevent the interval between the l-th mirror Ml and the n-th mirror Mn from being too small; and thus, it is possible to prevent the light beam before reaching the l-th mirror Ml and the light beam after being reflected from the n-th mirror Mn approach to each other and one of the light beam before reaching the l-th mirror Ml and the light beam after being reflected from the n-th mirror Mn from being shielded by the mirrors constituting the reflection optical system 30 or the image display element 21.

Figure 13:
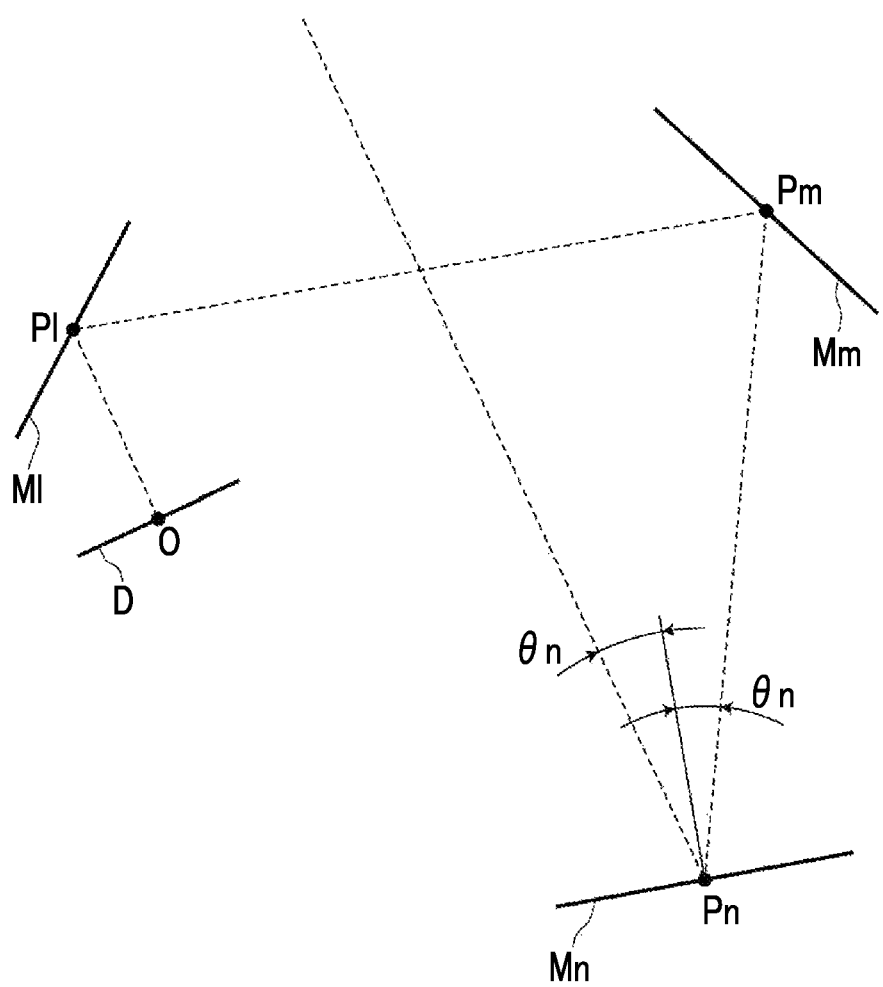
FIG. 13 is an explanatory view illustrating the contents indicated by the respective symbols in a conditional expression (4).

Next, the conditional expression (4) will be described in detail. FIG. 13 is an explanatory view illustrating the contents indicated by the respective symbols in the conditional expression (4). The conditional expression (4) determines the reflection angle θn of the light beam in the central optical path passing through the intersection point Pn on the n-th mirror Mn. The expression of the conditional expression (4) is determined not to be equal to or less than a lower limit of the conditional expression (4), whereby it is possible to prevent the reflection angle θn from being too small; thus, it is possible to prevent the light beam reflected from the n-th mirror Mn from being shielded by the m-th mirror Mm. The n-th mirror Mn is a mirror having a refractive power. Accordingly, the expression of the conditional expression (4) is determined not to be equal to or greater than an upper limit of the conditional expression (4), whereby it is possible to prevent the reflection angle θn from being too large; thus, it is possible to obtain a virtual image with less distortion.

Figure 14:
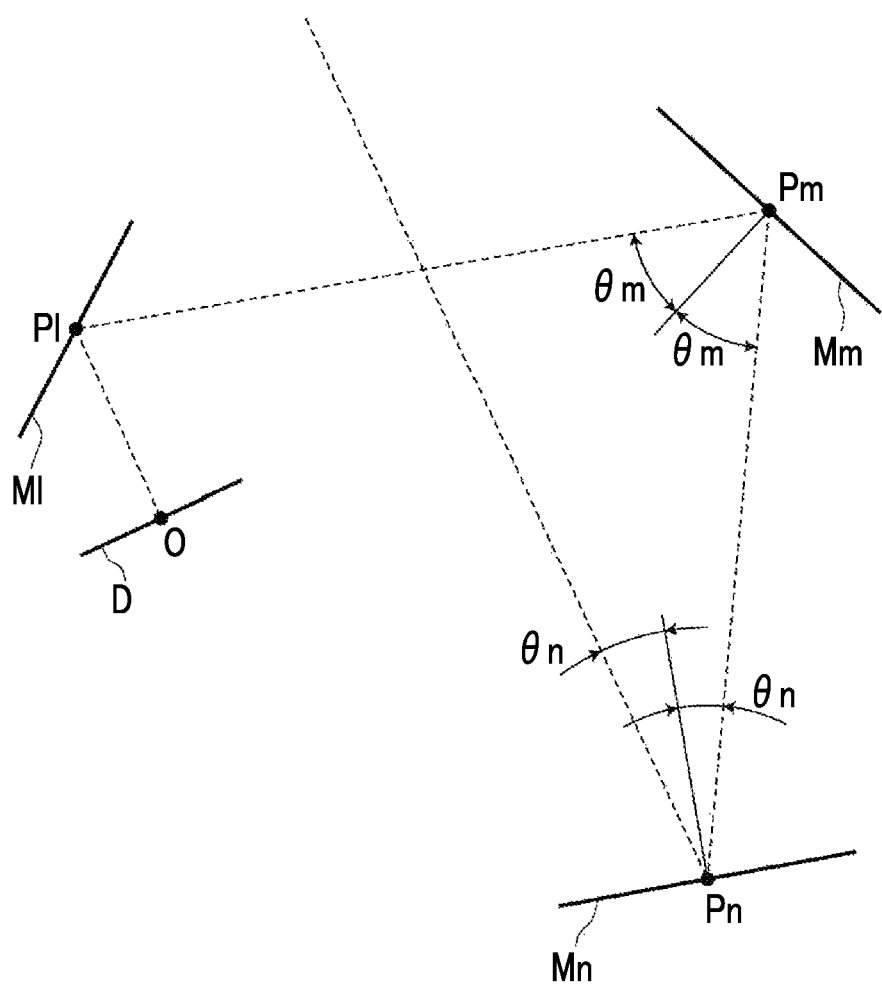
FIG. 14 is an explanatory view illustrating the contents indicated by the respective symbols in a conditional expression (5).

Next, the conditional expression (5) will be described in detail. FIG. 14 is an explanatory view illustrating the contents indicated by the respective symbols in the conditional expression (5). The conditional expression (5) determines θm with respect to θn, and determines the installation angle of the m-th mirror Mm to form an optical path in which a line connecting the intersection point Pl and the intersection point Pm is substantially perpendicular to the normal vector Wn of the n-th mirror Mn.

The expression of the conditional expression (5) is determined not to be equal to or less than a lower limit of the conditional expression (5), whereby it is possible to form an optical path in which a line connecting the intersection point Pl and the intersection point Pm is substantially perpendicular to the normal vector Wn of the n-th mirror Mn. With this, it is possible to minimize the length in the direction of the normal vector Wn; thus, it is possible to achieve reduction in size of the device. Furthermore, it is possible to prevent the reflection angle on the m-th mirror Mm from being too small, to eliminate an installation angle at which the m-th mirror Mm and the n-th mirror Mn face each other, and to prevent the light beam reflected from the n-th mirror Mn from being shielded by the m-th mirror Mm. The expression of the conditional expression (5) is determined not to be equal to or greater than an upper limit of the conditional expression (5), whereby it is possible to form an optical path in which a line connecting the intersection point Pl and the intersection point Pm is substantially perpendicular to the normal vector Wn of the n-th mirror Mn. With this, it is possible to minimize the length in the direction of the normal vector Wn; thus, it is possible to achieve reduction in size of the device.

Figure 15:
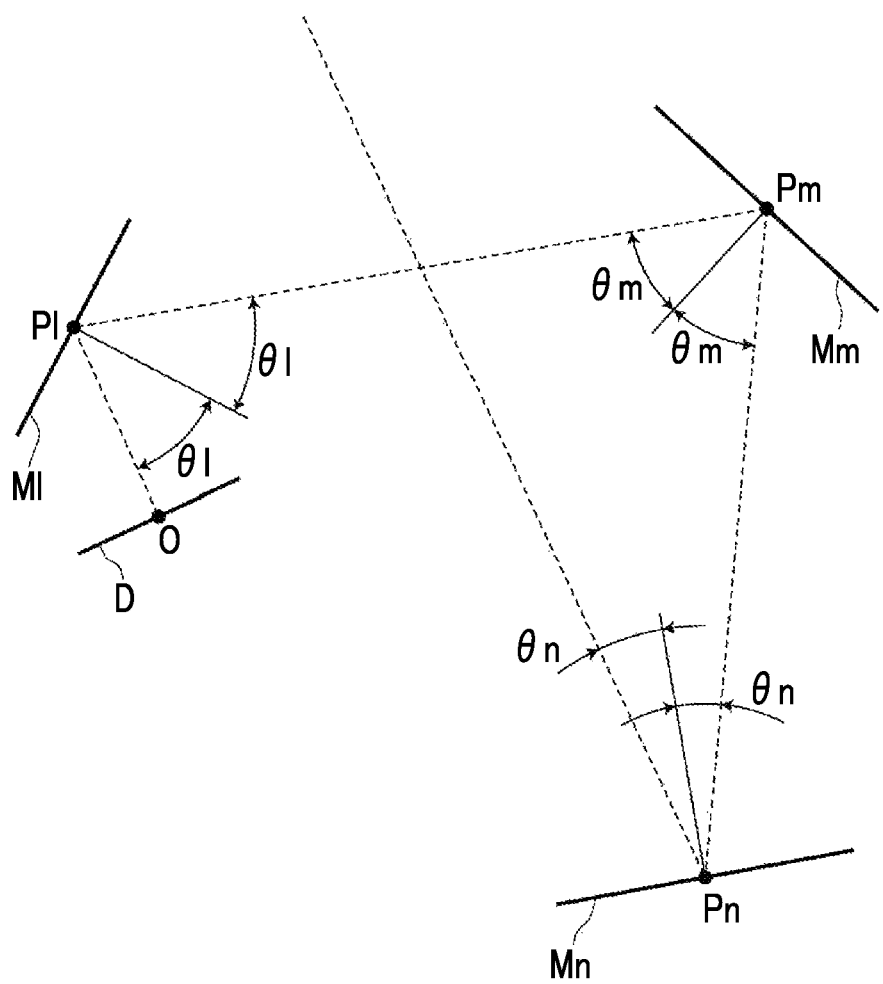
FIG. 15 is an explanatory view illustrating the contents indicated by the respective symbols in a conditional expression (6).

Next, the conditional expression (6) will be described in detail. FIG. 15 is an explanatory view illustrating the contents indicated by the respective symbols in the conditional expression (6). The conditional expression (6) determines θl with respect to θm and θn, and determines the installation angle of the l-th mirror Ml to form an optical path in which the light beam emitted from the n-th mirror Mn and the light beam incident on the l-th mirror Ml are substantially parallel to each other.

The expression of the conditional expression (6) is determined not to be equal to or less than a lower limit of the conditional expression (6), whereby it is possible to prevent the reflection angle on the l-th mirror Ml from being too small; thus, it is possible to prevent the light beam before reaching the l-th mirror Ml and the light beam after being reflected from the n-th mirror Mn approach to each other and one of the light beam before reaching the l-th mirror Ml and the light beam after being reflected from the n-th mirror Mn from being shielded by the mirrors constituting the reflection optical system 30 or the image display element 21. The expression of the conditional expression (6) is determined not to be equal to or greater than an upper limit of the conditional expression (6), whereby it is possible to prevent the reflection angle on the l-th mirror Ml from being too large, and to suppress the length (indicated by S2 in FIG. 17) in a direction perpendicular to the vector Vn in the mirror arrangement region of the reflection optical system; thus, it is possible to achieve reduction in size of the device.

While the conditional expressions (1) to (6) are satisfied, if one or a combination of multiple expressions of the following conditional expressions (1-1) to (6-1) and one or a combination of multiple expressions of the following conditional expressions (1-2) to (6-2) are satisfied, it is possible to obtain more satisfactory characteristics.

$$0.21 < \beta \times H1/\alpha m < 0.32 \quad (1\text{-}1)$$

$$0.22 < \beta \times H1/\alpha m < 0.30 \quad (1\text{-}2)$$

$$3.80 < \alpha m/(\alpha n \times \sin \theta n) < 4.50 \quad (2\text{-}1)$$

$$3.90 < \alpha m/(\alpha n \times \sin \theta n) < 4.30 \quad (2\text{-}2)$$

$$1.20 < \alpha m/(L^2 - (\alpha n \times \cos \theta n)^2)^{1/2} < 1.80 \quad (3\text{-}1)$$

$$1.25 < \alpha m/(L^2 - (\alpha n \times \cos \theta n)^2)^{1/2} < 1.70 \quad (3\text{-}2)$$

$$\pi/22 < \theta n < \pi/10 \quad (4\text{-}1)$$

$$\pi/20 < \theta n < \pi/11 \quad (4\text{-}2)$$

$$-\pi/18 < (\pi/2) - (2 \times \theta m + \theta n) < \pi/18 \quad (5\text{-}1)$$

$$-\pi/22 < (\pi/2) - (2 \times \theta m + \theta n) < \pi/22 \quad (5\text{-}2)$$

$$-\pi/18 < (\pi/2) - (\theta l + \theta m + \theta n) < \pi/18 \quad (6\text{-}1)$$

$$-\pi/22 < (\pi/2) - (\theta l + \theta m + \theta n) < \pi/22 \quad (6\text{-}2)$$

The head-up display 10 of this embodiment bends the optical path of the light beam emitted from the image display element 21 with at least three mirrors, and the arrangement positions or the arrangement angles of the three mirrors are configured to satisfy the conditional expressions (1) to (6); thus, it is possible to provide a head-up display capable of achieving reduction in size while securing the optical path length from the image display element to the image reflecting surface.

Figure 16:
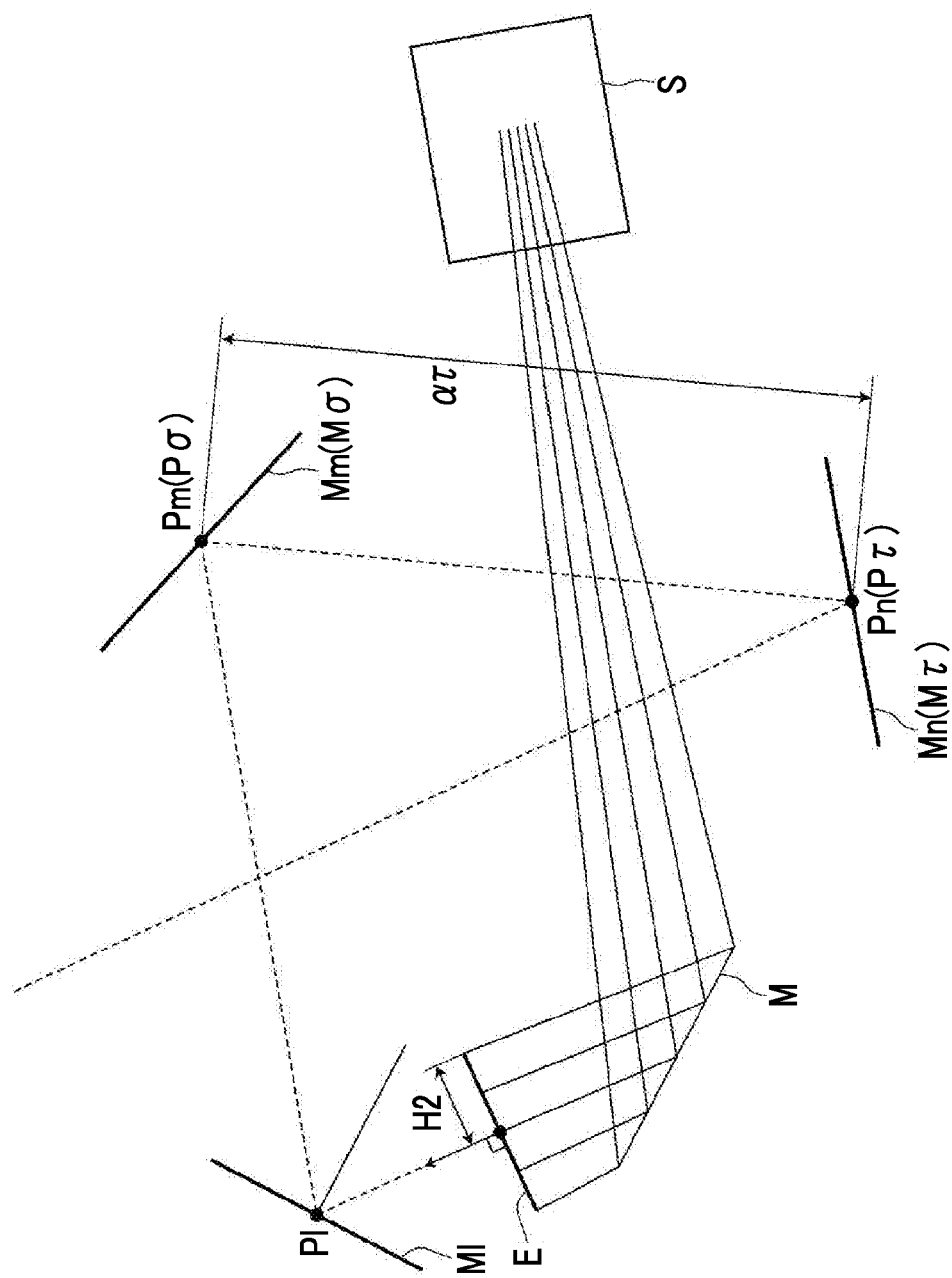
FIG. 16 is an explanatory view illustrating the contents indicated by the respective symbols in a conditional expression (7).

As shown in FIG. 16, the head-up display 10 of this embodiment may further comprise a diffusion member which diffuses and projects the light beam emitted from the image display element, the light beam emitted from the image display element being projected onto the image reflecting surface through the diffusion member, the light beam emitted from the image display element may pass through two adjacent mirrors from the image display element to the n-th mirror along the light beam emitted from the image display element, and the following conditional expression (7) may be satisfied.

The conditional expression (7) will be described in detail. FIG. 16 is an explanatory view illustrating the contents indicated by the respective symbols in the conditional expression (7). FIG. 16 shows a form in which a light beam emitted from an image display element included in a projection optical system S is once projected onto a diffusion member E, such as a diffuser. The conditional expression (7) determines the range of the ratio of the interval between two adjacent mirrors (referred to as a σ-th mirror Mσ and a τ-th mirror Mτ) to the light beam width of a light beam incident on the diffusion member E, and specifically, determines the interval between the σ-th mirror Mσ and the τ-th mirror Mτ according to an emitted light flux diameter necessary for irradiating the entire display region of the diffusion member E with light when the light beam emitted from the image display element passes between the σ-th mirror Mσ and the τ-th mirror Mτ without being shielded by the σ-th mirror Mσ and the τ-th mirror Mτ.

The expression of the conditional expression (7) is determined not to be equal to or less than a lower limit of the conditional expression (7), whereby it is possible to prevent the interval between the σ-th mirror Mσ and the τ-th mirror Mτ from being too large with respect to the light beam width of the light beam incident on the diffusion member E; thus, it is possible to suppress the size of the combined space of the projection optical system and the reflection optical system to be small. The expression of the conditional expression (7) is determined not to be equal to or greater than an upper limit of the conditional expression (7), whereby it is possible to prevent the interval between the σ-th mirror Mσ and the τ-th mirror Mτ from being too small with respect to the light beam width of the light beam incident on the diffusion member E; thus, the light beam emitted from the image display element is not shielded by the σ-th mirror Mσ or the τ-th mirror Mτ, and a necessary light beam can pass between the σ-th mirror Mσ and the τ-th mirror Mτ.

If a conditional expression (7-1) and a conditional expression (7-2) are satisfied, it is possible to obtain more satisfactory characteristics.

$$0.20 < 2 \times H2/\alpha\tau < 0.40 \quad (7)$$

$$0.22 < 2 \times H2/\alpha\tau < 0.38 \quad (7\text{-}1)$$

$$0.24 < 2 \times H2/\alpha\tau < 0.36 \quad (7\text{-}2)$$

In the conditional expressions, when the two adjacent mirrors are a σ-th mirror and a τ-th mirror in this order from the image display element side, an intersection point of the central light beam and the σ-th mirror is Pσ, and an intersection point of the central light beam and the τ-th mirror is Pτ, H2: the distance between the center and the end of a display region of the diffusion member in the plane U ατ: the distance between the intersection point Pσ and the intersection point Pτ.

In the head-up display 10 of this embodiment, the image display element may be a transmissive image display element or a reflective image display element. In a case of a transmissive image display element, the image display element and a backlight as a light source may be integrated, or the image display element and the light source may be separated from each other.

Figure 3:
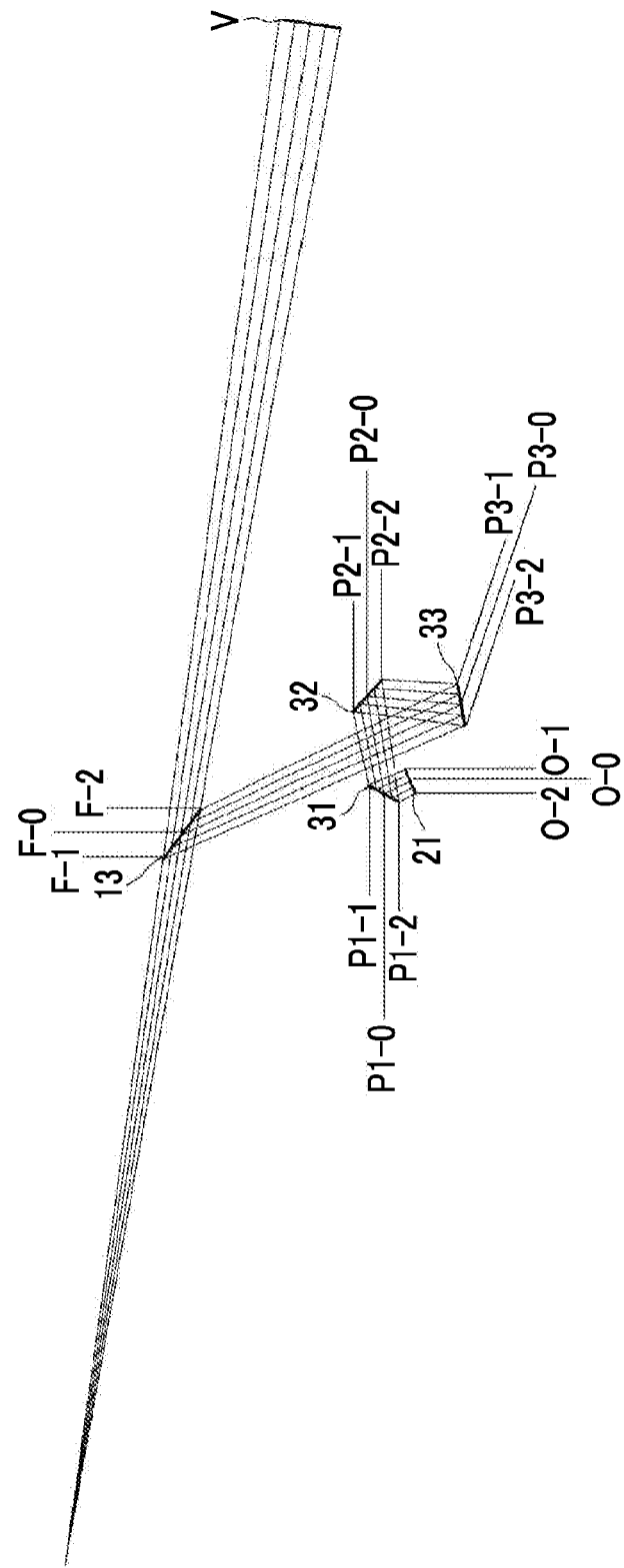
FIG. 3 is a schematic configuration diagram (the same as in Example 1) of a reflection optical system of the head-up display according to the embodiment of the invention.

Next, numerical examples of the reflection optical system of the head-up display of the invention will be described. First, a reflection optical system of a head-up display of Example 1 will be described. FIG. 3 is a schematic configuration diagram of a reflection optical system of a head-up display of Example 1.

The reflection optical system of the head-up display of Example 1 comprises three mirrors including a first mirror 31 (corresponding to the l-th mirror), a second mirror 32 (corresponding to the m-th mirror), and a third mirror 33 (corresponding to the n-th mirror).

The coordinates of the image display element 21, the first mirror 31 (corresponding to the l-th mirror), the second mirror 32 (corresponding to the m-th mirror), the third mirror 33 (corresponding to the n-th mirror), and the front window (image reflecting surface) 13 in the plane U are shown in Table. In Table 1, an intersection point of the central light beam and the n-th mirror is the origin, the normal vector Wn of the n-th mirror is the Y axis, and a direction orthogonal to the Y axis in the plane U is the X axis. In regard to numbers at the respective component positions, "–0" represents a central position, "–1" represents an end portion, in which a Y-axis component is large in a positive direction, out of both ends, and "–2" represents an end portion, in which the Y-axis component is small in the positive direction, out of both ends.

In FIG. 3, although only a case where the pupil position of the driver is one point is shown, in practice, it is assumed that the pupil position of the driver moves. If the pupil position moves, a light flux region also moves; thus, a mirror size based on the end point of each mirror indicated by the coordinates of Table 1 is not necessarily the same as an actual mirror size, and the actual mirror size may be made greater than the mirror size based on the end point of each mirror indicated by the coordinates in Table 1.

The third mirror 33 (corresponding to the n-th mirror) is a mirror having a refractive power, and a free-form curved surface coefficient of third mirror 33 is shown in Table 2. The free-form curved surface coefficient is the value of a rotationally asymmetric aspheric coefficient C(i,j) in a free-form curved surface expression represented by the following expression. The rotationally asymmetric aspheric coefficient is not particularly described in Table 2 is 0.

$$Z = \sum_i \sum_j C(i, j) X^i Y^j$$

X, Y, Z: respective coordinates with a surface vertex as an origin

C(i,j): rotationally asymmetric aspheric coefficient (i+j=k, k=1 to 8)

The respective dimensions of the reflection optical system of the head-up display of Example 1 are shown in Table 3.

$\alpha_i$: the distance between an intersection point Pi and an intersection point Pi−1 (i: mirror number, and P0 is the central position of the image display element)

Ai: the central optical path length from the central position of the image display element to the intersection point Pi (i: mirror number)

$\beta$: a paraxial magnification of the n-th mirror

H1: the distance between the center and the end of a display region of the image display element in the plane U H2: the distance between the center and the end of a display region of the diffusion member in the plane U Ki: a half value of an emitted light flux diameter from an i-th mirror (i: mirror number)

R: a paraxial curvature radius of the n-th mirror (a convex surface has a positive sign, and a concave surface has a negative sign)

B: an image distance derived from an imaging relationship

C: the distance between the n-th mirror and the image reflecting surface along the central optical path D: the distance between the image reflecting surface and the pupil along the central optical path Li: the distance between the intersection point Pi and the intersection point Pn (i: mirror number)

L$\omega$: a maximum length of a component parallel to the vector Wn among the respective distances between the intersection point Pn and the intersection points Pl to Pn−1

Lv: a maximum length of a component perpendicular to the vector Vn (a vector from the intersection point Pn toward an intersection point F (an intersection point of the central light beam and the image reflecting surface)) among the respective distances between the intersection point Pn and the intersection points Pl to Pn−1

$\phi$: the angle between a vector Vl (a vector from the intersection point Pl toward the intersection point Pm) and the vector Vn (a vector from the intersection point Pn toward the intersection point F (an intersection point of the central light beam and the image reflecting surface))

$\theta_i$: an incidence angle or a reflection angle of the central light beam at the intersection point Pi (i: mirror number)

Figure 4:
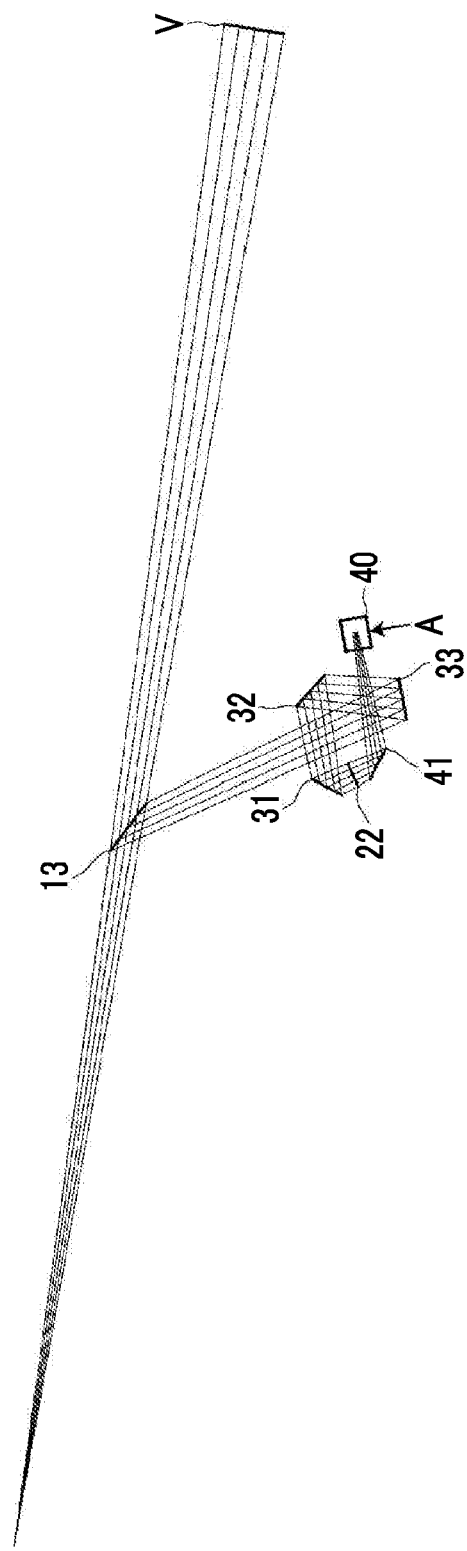
FIG. 4 is a schematic configuration diagram of another form of a reflection optical system of a head-up display of Example 1 of the invention.

Next, in the head-up display of Example 1, a schematic configuration diagram of the reflection optical system in a case where the light beam emitted from the image display element is once projected onto a diffusion member, such as a diffuser, is shown in FIG. 4. In a case where a virtual image is projected without passing through the diffusion member, sharpness of the virtual image is increased, while the range of the pupil position in which the virtual image can be confirmed clearly is restricted to an extremely narrow range. For this reason, if the head of the driver is moved with respect to the image reflecting surface, visibility may be lowered. In order to eliminate such a problem, as shown in FIG. 4, the virtual image V is projected through a diffusion member 22, such as a diffuser, whereby it is possible to enlarge the range of the pupil position in which the virtual image V can be confirmed clearly.

Figure 9:
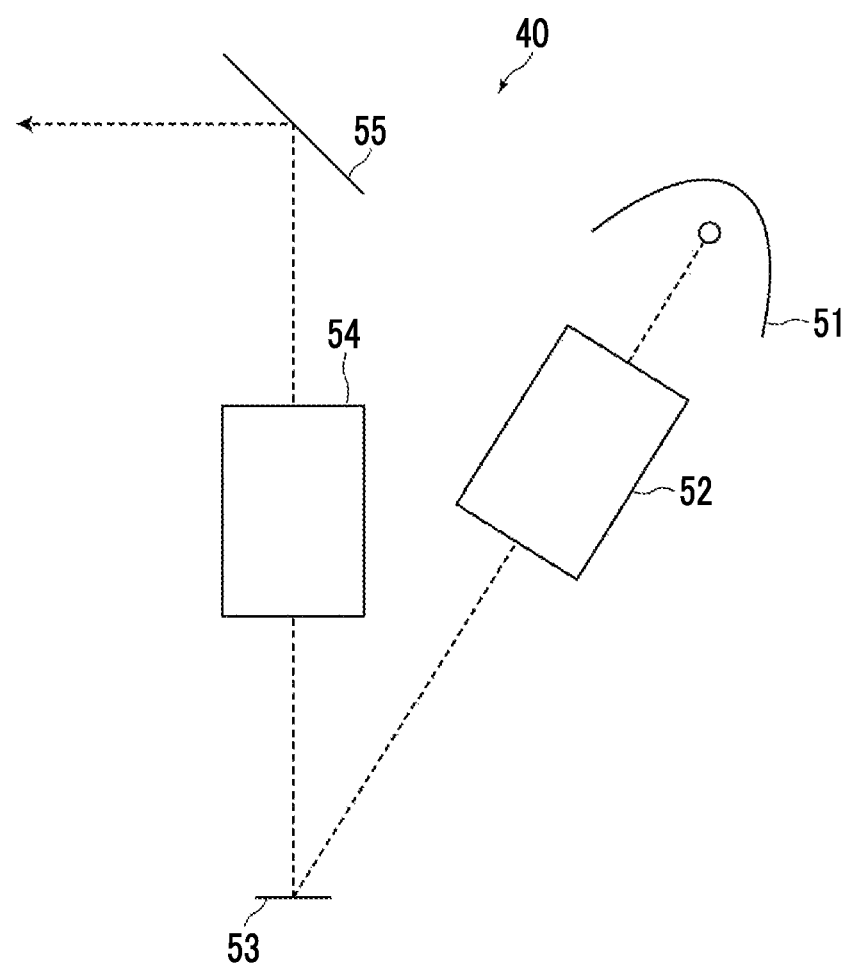
FIG. 9 is a schematic configuration diagram of a projection optical system of the head-up display according to the embodiment of the invention.

In a case of combining the diffusion member with the head-up display of Example 1, a diffusion member 22, a projection optical system 40 which projects the light beam emitted from the image display element to the diffusion member 22, and a mirror 41 are added. The projection optical system 40 will be described in detail. FIG. 9 is a schematic configuration diagram of the projection optical system 40 shown in FIG. 4 when viewed from an arrow A direction in FIG. 4.

The projection optical system 40 has a light source 51, an illumination optical system 52, a digital micromirror device (DMD: Registered Trademark) 53 as an image display element, a projection lens 54, and a mirror 55. In FIG. 9, the respective components described above are schematically shown. A light beam emitted from the light source 51 is selectively converted to respective light beams of three primary color light beams (R, G, and B) in a time series by a color wheel (not shown), is uniformized in light quantity distribution in a section perpendicular to the optical axis of the light beam by the illumination optical system 52, and is then incident on the DMD 53. In the DMD 53, modulation switching to the respective color light beams is performed according to switching of the colors of incident light. Light subjected to optical modulation by the DMD 53 is incident on the projection lens 54. An emission pupil position of the illumination optical system 52 and an incidence pupil position of the projection lens 54 (corresponding to a reduction side pupil position of the projection lens 54) are configured to substantially match each other. A light beam emitted from the projection lens 54 is reflected from the mirror 55 and the mirror 41 and is projected to the diffusion member 22. The projection optical system 40 is not limited to the configuration described above, and various forms, such as a form in which a DMD is provided for each primary color, and a form in which a transmissive image display element is used to make a light beam incident from the rear surface of the image display element, can be made.

In this example, the light beam emitted from the projection optical system 40 is configured to pass between the second mirror 32 and the third mirror 33, the second mirror 32 corresponds to the $\sigma$-th mirror in the conditional expression (7), and the third mirror 33 corresponds to the $\tau$-th mirror in the conditional expression (7).

Although the meanings of the symbols in the table and the configuration of the projection optical system has been described with those in Example 1 as an example, these are basically the same as those in Examples 2 and 3, and thus, further description will be omitted.

TABLE 1

Example 1

| Number | x | y |
|---|---|---|
| O-0 | −81.177 | 77.274 |
| O-1 | −66.447 | 81.221 |
| O-2 | −95.907 | 73.327 |
| P1-0 | −90.236 | 111.081 |
| P1-1 | −77.245 | 128.012 |
| P1-2 | −102.559 | 95.021 |
| P2-0 | 29.764 | 111.081 |
| P2-1 | 14.313 | 131.218 |
| P2-2 | 46.168 | 89.704 |
| P3-0 | 0.000 | 0.000 |
| P3-1 | −25.711 | 0.325 |
| P3-2 | 25.617 | 0.323 |
| F-0 | −97.057 | 362.222 |
| F-1 | −121.666 | 388.612 |
| F-2 | −70.756 | 334.018 |

TABLE 2

Example 1

| | |
|---|---|
| C(1,0) | 0.0000000E+00 |
| C(0,1) | 0.0000000E+00 |
| C(2,0) | 5.9225487E−05 |
| C(1,1) | 0.0000000E+00 |
| C(0,2) | 4.3528928E−05 |
| C(3,0) | 0.0000000E+00 |
| C(2,1) | 1.0422756E−07 |
| C(1,2) | 0.0000000E+00 |
| C(0,3) | 1.1992905E−07 |
| C(4,0) | 2.6699162E−10 |
| C(3,1) | 0.0000000E+00 |
| C(2,2) | −1.9395346E−10 |
| C(1,3) | 0.0000000E+00 |
| C(0,4) | −2.6412411E−09 |
| C(5,0) | 0.0000000E+00 |
| C(4,1) | 1.2222019E−11 |
| C(3,2) | 0.0000000E+00 |
| C(2,3) | 2.2829643E−12 |
| C(1,4) | 0.0000000E+00 |
| C(0,5) | −2.3463867E−11 |
| C(6,0) | 1.3899570E−14 |
| C(5,1) | 0.0000000E+00 |
| C(4,2) | 2.5015246E−14 |
| C(3,3) | 0.0000000E+00 |
| C(2,4) | 1.6173528E−13 |
| C(1,5) | 0.0000000E+00 |
| C(0,6) | 1.4733360E−12 |
| C(7,0) | 0.0000000E+00 |
| C(6,1) | −7.3641442E−17 |
| C(5,2) | 0.0000000E+00 |
| C(4,3) | −7.5977056E−16 |
| C(3,4) | 0.0000000E+00 |
| C(2,5) | −1.6534915E−15 |
| C(1,6) | 0.0000000E+00 |
| C(0,7) | 7.2091197E−15 |
| C(8,0) | −9.5060131E−19 |
| C(7,1) | 0.0000000E+00 |
| C(6,2) | 3.4973588E−19 |
| C(5,3) | 0.0000000E+00 |
| C(4,4) | −8.4826275E−18 |
| C(3,5) | 0.0000000E+00 |
| C(2,6) | −6.2873112E−18 |
| C(1,7) | 0.0000000E+00 |
| C(0,8) | −2.2353940E−16 |

TABLE 3

Example 1

| | |
|---|---|
| α1 | 35.0 |
| α2 | 120.0 |
| α3 | 115.0 |
| α4 | |
| α5 | |
| A1 | 35.0 |
| A2 | 155.0 |
| A3 | 270.0 |
| A4 | |
| A5 | |
| β | 2.1349 |
| R | −1015.793 |
| B | 576.436 |
| C | 375.0 |
| D | 900.0 |
| H1 | 15.25 |
| H2 | 15.25 |
| Ks | 20.818 |
| Kt | 23.924 |
| Kn | 22.421 |
| L1 | 143.114 |
| L2 | 115.000 |
| L3 | |
| L4 | |
| Component parallel to Wn in L1 | 111.081 |
| Component parallel to Wn in L2 | 111.081 |
| Component parallel to Wn in L3 | |
| Component parallel to Wn in L4 | |
| Lω | 111.081 |
| Component perpendicular to Vn in L1 | 58.411 |
| Component perpendicular to Vn in L2 | 57.500 |
| Component perpendicular to Vn in L3 | |
| Component perpendicular to Vn in L4 | |
| Lv | 58.411 |
| φ [deg] | 105.0 |
| θ1 [deg] | 37.5 |
| θ2 [deg] | 37.5 |
| θ3 [deg] | 15.0 |
| θ4 [deg] | |
| θ5 [deg] | |
| θF [deg] | 62.0 |

Figure 5:
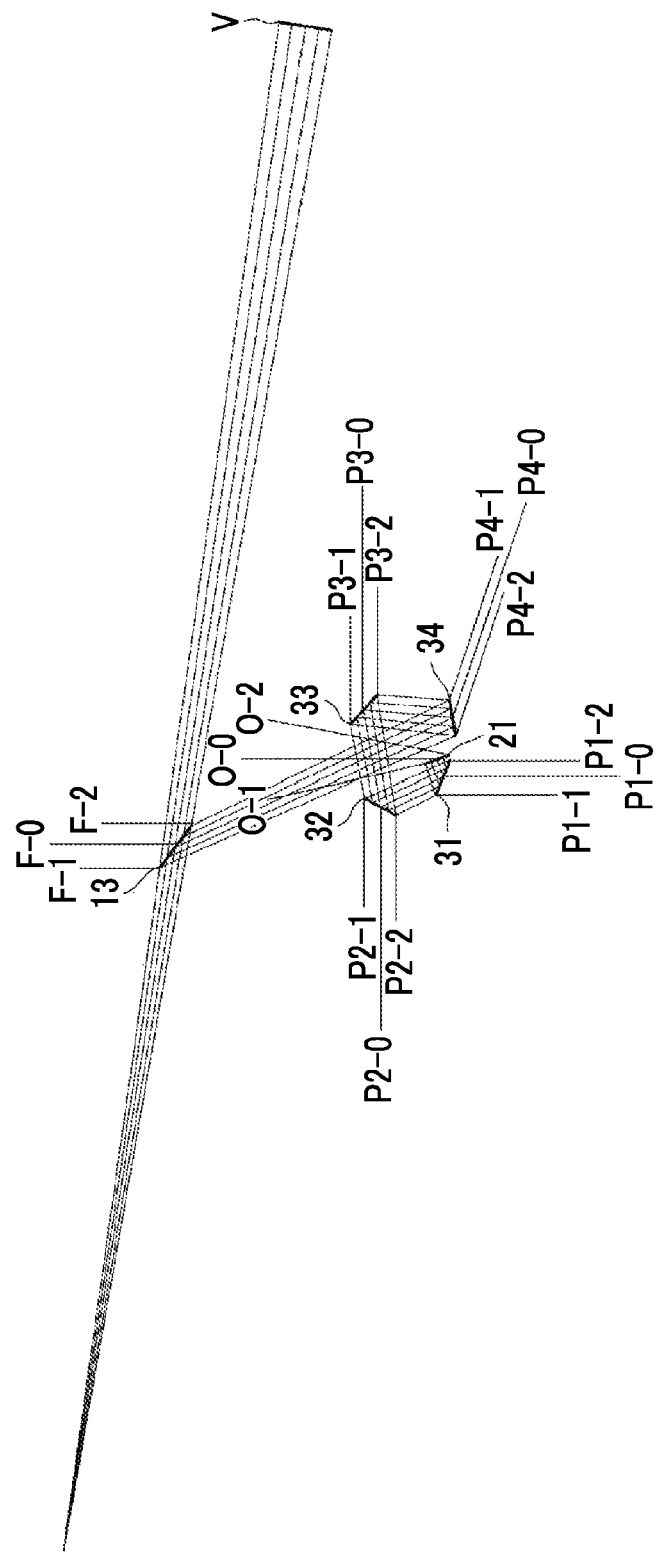
FIG. 5 is a schematic configuration diagram of a reflection optical system of a head-up display of Example 2 of the invention.

Next, a reflection optical system of a head-up display of Example 2 will be described. FIG. 5 is a schematic configuration diagram of a reflection optical system of a head-up display of Example 2. The reflection optical system of the head-up display of Example 2 comprises four mirrors including a first mirror 31, a second mirror 32 (corresponding to the l-th mirror), a third mirror 33 (corresponding to the m-th mirror), and a fourth mirror 34 (corresponding to the n-th mirror).

The coordinates of the image display element 21, the first mirror 31, the second mirror 32 (corresponding to the l-th mirror), the third mirror 33 (corresponding to the m-th mirror), the fourth mirror 34 (corresponding to the n-th mirror), and the front window (image reflecting surface) 13 in the plane U are shown in Table 4.

The fourth mirror 34 (corresponding to the n-th mirror) is a mirror having a refractive power, and a free-form curved surface coefficient of the fourth mirror 34 is shown in Table 5.

The respective dimensions of the reflection optical system of the head-up display of Example 2 are shown in Table 6.

Figure 6:
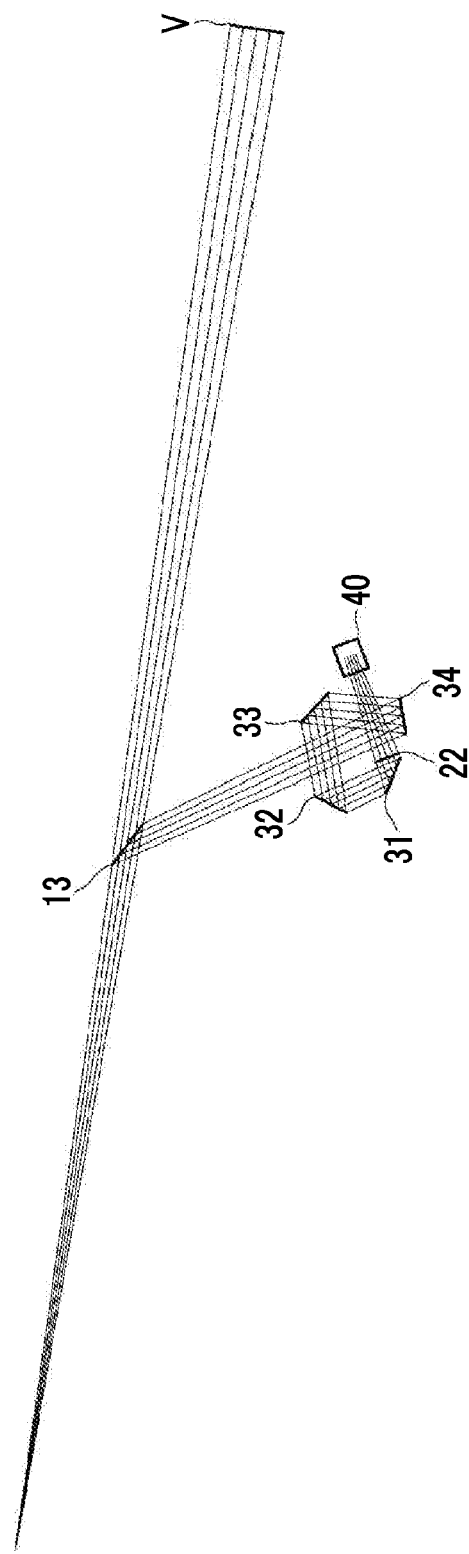
FIG. 6 is a schematic configuration diagram of another form of the reflection optical system of the head-up display of Example 2 of the invention.

In the head-up display of Example 2, a schematic configuration diagram of the reflection optical system in a case where the light beam emitted from the image display element is once projected onto a diffusion member is shown in FIG. 6.

In a case of combining a diffusion member with the head-up display of Example 2, a diffusion member 22 and a projection optical system 40 are added. In this example, the light beam emitted from the projection optical system 40 is configured to pass between the third mirror 33 and the fourth mirror 34, the third mirror 33 corresponds to the σ-th mirror in the conditional expression (7), and the fourth mirror 34 corresponds to the τ-th mirror in the conditional expression (7).

TABLE 4

Example 2

| Number | x | y |
|---|---|---|
| O-0 | −47.372 | 28.055 |
| O-1 | −50.020 | 43.074 |
| O-2 | −44.724 | 13.037 |
| P1-0 | −69.530 | 24.148 |
| P1-1 | −50.365 | 36.869 |
| P1-2 | −89.498 | 11.938 |
| P2-0 | −91.530 | 106.252 |
| P2-1 | −78.177 | 123.654 |
| P2-2 | −104.583 | 89.241 |
| P3-0 | 28.470 | 106.252 |
| P3-1 | 13.860 | 125.293 |
| P3-2 | 43.643 | 86.478 |
| P4-0 | 0.000 | 0.000 |
| P4-1 | 22.240 | 0.175 |
| P4-2 | −22.060 | 0.172 |
| F-0 | −97.057 | 362.222 |
| F-1 | −118.289 | 384.991 |
| F-2 | −74.355 | 337.877 |

TABLE 5

Example 2

| | |
|---|---|
| C(1,0) | 0.0000000E+00 |
| C(0,1) | 0.0000000E+00 |
| C(2,0) | 5.9225487E−05 |
| C(1,1) | 0.0000000E+00 |
| C(0,2) | 4.3528928E−05 |
| C(3,0) | 0.0000000E+00 |
| C(2,1) | 1.0422756E−07 |
| C(1,2) | 0.0000000E+00 |
| C(0,3) | 1.1992905E−07 |
| C(4,0) | 2.6699162E−10 |
| C(3,1) | 0.0000000E+00 |
| C(2,2) | −1.9395346E−10 |
| C(1,3) | 0.0000000E+00 |
| C(0,4) | −2.6412411E−09 |
| C(5,0) | 0.0000000E+00 |
| C(4,1) | 1.2222019E−11 |
| C(3,2) | 0.0000000E+00 |
| C(2,3) | 2.2829643E−12 |
| C(1,4) | 0.0000000E+00 |
| C(0,5) | −2.3463867E−11 |
| C(6,0) | 1.3899570E−14 |
| C(5,1) | 0.0000000E+00 |
| C(4,2) | 2.5015246E−14 |
| C(3,3) | 0.0000000E+00 |
| C(2,4) | 1.6173528E−13 |
| C(1,5) | 0.0000000E+00 |
| C(0,6) | 1.4733360E−12 |
| C(7,0) | 0.0000000E+00 |
| C(6,1) | −7.3641442E−17 |
| C(5,2) | 0.0000000E+00 |
| C(4,3) | −7.5977056E−16 |
| C(3,4) | 0.0000000E+00 |
| C(2,5) | −1.6534915E−15 |
| C(1,6) | 0.0000000E+00 |
| C(0,7) | 7.2091197E−15 |
| C(8,0) | −9.5060131E−19 |
| C(7,1) | 0.0000000E+00 |
| C(6,2) | 3.4973588E−19 |
| C(5,3) | 0.0000000E+00 |
| C(4,4) | −8.4826275E−18 |
| C(3,5) | 0.0000000E+00 |
| C(2,6) | −6.2873112E−18 |
| C(1,7) | 0.0000000E+00 |
| C(0,8) | −2.2353940E−16 |

TABLE 6

Example 2

| | |
|---|---|
| α1 | 22.5 |
| α2 | 85.0 |
| α3 | 120.0 |
| α4 | 110.0 |
| α5 | |
| A1 | 22.5 |
| A2 | 107.5 |
| A3 | 227.5 |
| A4 | 337.5 |
| A5 | |
| β | 1.9112 |
| R | −1415.793 |
| B | 645.025 |
| C | 375.0 |
| D | 900.0 |
| H1 | 15.25 |
| H2 | 15.25 |
| Ks | 21.067 |
| Kt | 22.499 |
| Kn | 19.354 |
| L1 | 73.604 |
| L2 | 140.240 |
| L3 | 110.000 |
| L4 | |
| Component parallel to Wn in L1 | 24.148 |
| Component parallel to Wn in L2 | 106.252 |
| Component parallel to Wn in L3 | 106.252 |
| Component parallel to Wn in L4 | |
| Lω | 106.252 |
| Component perpendicular to Vn in L1 | 60.911 |
| Component perpendicular to Vn in L2 | 60.911 |
| Component perpendicular to Vn in L3 | 55.000 |
| Component perpendicular to Vn in L4 | |
| Lv | 60.911 |
| φ [deg] | 105.0 |
| θ1 [deg] | 47.5 |
| θ2 [deg] | 37.5 |
| θ3 [deg] | 37.5 |
| θ4 [deg] | 15.0 |
| θ5 [deg] | |
| θF [deg] | 62.0 |

Figure 7:
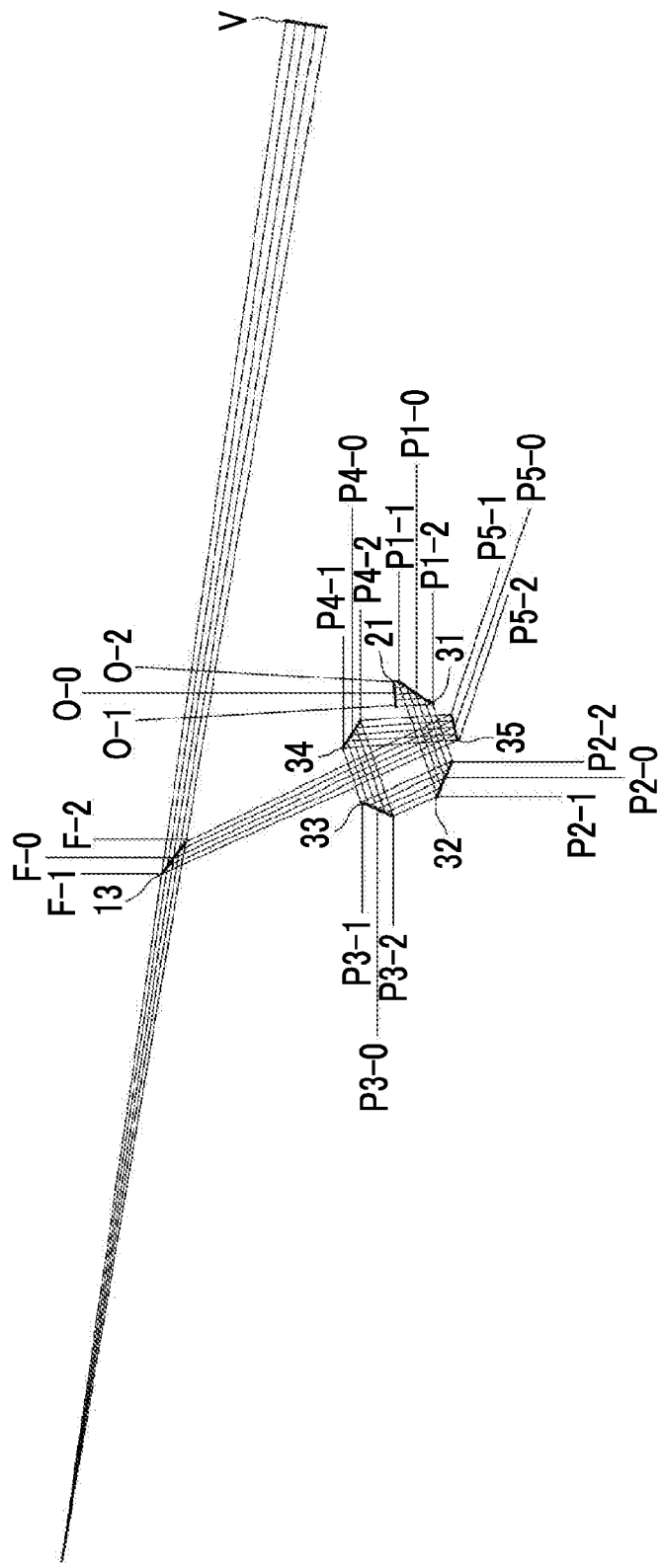
FIG. 7 is a schematic configuration diagram of a reflection optical system of a head-up display of Example 3 of the invention.

Next, a reflection optical system of a head-up display of Example 3 will be described. FIG. 7 is a schematic configuration diagram of a reflection optical system of a head-up display of Example 3. The reflection optical system of the head-up display of Example 3 comprises five mirrors including a first mirror 31, a second mirror 32, a third mirror 33 (corresponding to the l-th mirror), a fourth mirror 34 (corresponding to the m-th mirror), and a fifth mirror 35 (corresponding to the n-th mirror).

The coordinates of the image display element 21, the first mirror 31, the second mirror 32, the third mirror 33 (corresponding to the l-th mirror), the fourth mirror 34 (corresponding to the m-th mirror), the fifth mirror 35 (corresponding to the n-th mirror), and the front window (image reflecting surface) 13 in the plane U are shown in Table 7.

The fifth mirror 35 (corresponding to the n-th mirror) is a mirror having a refractive power, and a free-form curved surface coefficient of the fifth mirror 35 is shown in Table 8.

The respective dimensions of the reflection optical system of the head-up display of Example 3 are shown in Table 9.

Figure 8:
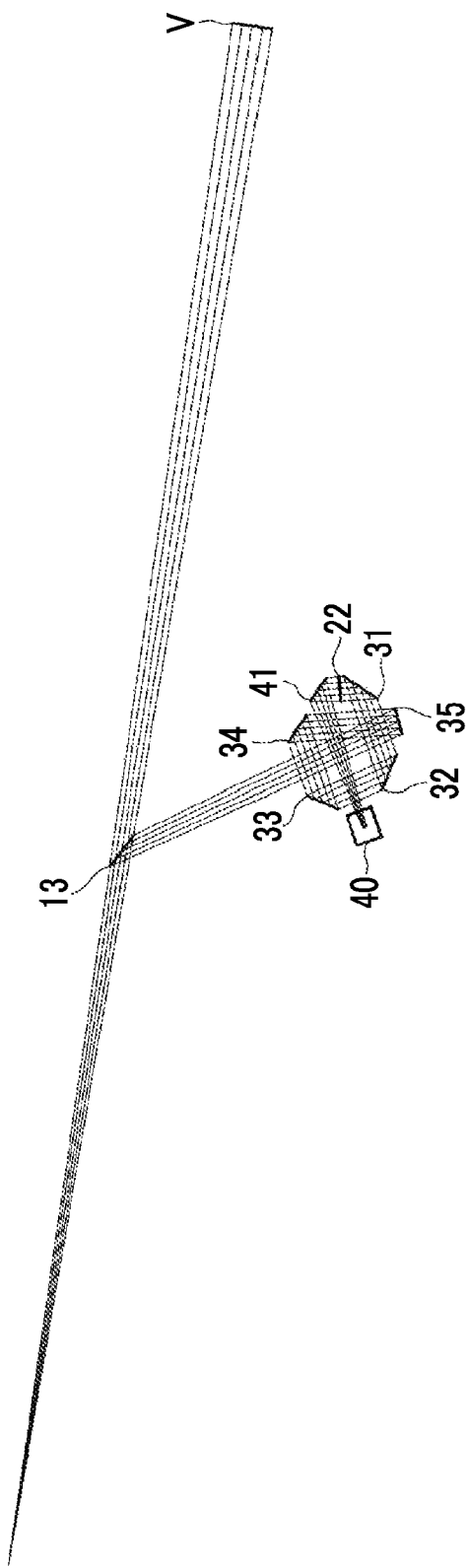
FIG. 8 is a schematic configuration diagram of another form of the reflection optical system of the head-up display of Example 3 of the invention.

In the head-up display of Example 3, a schematic configuration diagram of the reflection optical system in a case where the light beam emitted from the image display element is once projected onto a diffusion member is shown in FIG. 8.

In a case of combining a diffusion member with the head-up display of Example 3, a diffusion member 22, a projection optical system 40, and a mirror 41 are added. In this example, the light beam emitted from the projection optical system 40 is configured to pass between the second mirror 32 and the third mirror 33 and between the fourth mirror 34 and the fifth mirror 35. In this case, the number of combinations of mirrors which are subjected to the calculation of the conditional expression (7) is two, and in the first combination, the second mirror 32 corresponds to the σ-th mirror in the conditional expression (7) and the third mirror 33 corresponds to the τ-th mirror in the conditional expression (7). In the second combination, the fourth mirror 34 corresponds to the σ-th mirror in the conditional expression (7) and the fifth mirror 35 corresponds to the τ-th mirror in the conditional expression (7).

TABLE 7

Example 3

| Number | x | y |
|---|---|---|
| O-0 | 57.143 | 59.899 |
| O-1 | 42.149 | 62.678 |
| O-2 | 72.138 | 57.120 |
| P1-0 | 52.587 | 35.318 |
| P1-1 | 71.216 | 52.091 |
| P1-2 | 33.885 | 18.478 |
| P2-0 | −57.074 | 26.688 |
| P2-1 | −75.213 | 40.860 |
| P2-2 | −39.070 | 12.621 |
| P3-0 | −71.928 | 115.453 |
| P3-1 | −58.880 | 132.154 |
| P3-2 | −85.011 | 98.707 |
| P4-0 | 22.779 | 122.907 |
| P4-1 | 9.510 | 137.644 |
| P4-2 | 36.198 | 108.004 |
| P5-0 | 0.000 | 0.000 |
| P5-1 | 16.413 | 0.048 |
| P5-2 | −16.214 | 0.047 |
| F-0 | −68.338 | 368.721 |
| F-1 | −82.941 | 387.079 |
| F-2 | −52.891 | 349.301 |

TABLE 8

Example 3

| C(1,0) | 0.0000000E+00 |
|---|---|
| C(0,1) | 0.0000000E+00 |
| C(2,0) | 5.9225487E−05 |
| C(1,1) | 0.0000000E+00 |
| C(0,2) | 4.3528928E−05 |
| C(3,0) | 0.0000000E+00 |
| C(2,1) | 1.0422756E−07 |
| C(1,2) | 0.0000000E+00 |
| C(0,3) | 1.1992905E−07 |
| C(4,0) | 2.6699162E−10 |
| C(3,1) | 0.0000000E+00 |
| C(2,2) | −1.9395346E−10 |
| C(1,3) | 0.0000000E+00 |
| C(0,4) | −2.6412411E−09 |
| C(5,0) | 0.0000000E+00 |
| C(4,1) | 1.2222019E−11 |
| C(3,2) | 0.0000000E+00 |
| C(2,3) | 2.2829643E−12 |
| C(1,4) | 0.0000000E+00 |
| C(0,5) | −2.3463867E−11 |
| C(6,0) | 1.3899570E−14 |
| C(5,1) | 0.0000000E+00 |
| C(4,2) | 2.5015246E−14 |

TABLE 8-continued

Example 3

| C(3,3) | 0.0000000E+00 |
|---|---|
| C(2,4) | 1.6173528E−13 |
| C(1,5) | 0.0000000E+00 |
| C(0,6) | 1.4733360E−12 |
| C(7,0) | 0.0000000E+00 |
| C(6,1) | −7.3641442E−17 |
| C(5,2) | 0.0000000E+00 |
| C(4,3) | −7.5977056E−16 |
| C(3,4) | 0.0000000E+00 |
| C(2,5) | −1.6534915E−15 |
| C(1,6) | 0.0000000E+00 |
| C(0,7) | 7.2091197E−15 |
| C(8,0) | −9.5060131E−19 |
| C(7,1) | 0.0000000E+00 |
| C(6,2) | 3.4973588E−19 |
| C(5,3) | 0.0000000E+00 |
| C(4,4) | −8.4826275E−18 |
| C(3,5) | 0.0000000E+00 |
| C(2,6) | −6.2873112E−18 |
| C(1,7) | 0.0000000E+00 |
| C(0,8) | −2.2353940E−16 |

TABLE 9

Example 3

| α1 | 25.0 |
|---|---|
| α2 | 110.0 |
| α3 | 90.0 |
| α4 | 95.0 |
| α5 | 125.0 |
| A1 | 25.0 |
| A2 | 135.0 |
| A3 | 225.0 |
| A4 | 320.0 |
| A5 | 445.0 |
| β | 1.4621 |
| R | −2815.793 |
| B | 650.656 |
| C | 375.0 |
| D | 900.0 |
| H1 | 15.25 |
| H2 | 15.25 |
| Ks | 20.330 |
| Kt | 18.797 |
| Kn | 14.764 |
| L1 | 63.347 |
| L2 | 63.005 |
| L3 | 136.026 |
| L4 | 125.000 |
| Component parallel to Wn in L1 | 35.318 |
| Component parallel to Wn in L2 | 26.688 |
| Component parallel to Wn in L3 | 115.453 |
| Component parallel to Wn in L4 | 122.907 |
| Lω | 122.907 |
| Component perpendicular to Vn in L1 | 58.143 |
| Component perpendicular to Vn in L2 | 51.254 |
| Component perpendicular to Vn in L3 | 49.684 |
| Component perpendicular to Vn in L4 | 44.796 |
| Lv | 58.143 |
| φ [deg] | 96.0 |
| θ1[deg] | 52.5 |
| θ2[deg] | 47.5 |
| θ3[deg] | 42.5 |
| θ4[deg] | 37.5 |
| θ5[deg] | 10.5 |
| θF[deg] | 62.0 |

The values corresponding to the conditional expressions (1) to (7) of the head-up displays of Examples 1 to 3 are shown in Table 10.

TABLE 10

| Expression Number | Conditional Expression | Example 1 | Example 2 | Example 3 |
|---|---|---|---|---|
| (1) | $\beta \times H1/\alpha m$ | 0.2713 | 0.2429 | 0.2347 |
| (2) | $\alpha m/(\alpha n \times \sin\theta n)$ | 4.0317 | 4.2149 | 4.1704 |
| (3) | $\alpha m/(L^2 - (\alpha n \times \cos\theta n)^2)^{1/2}$ | 1.3298 | 1.3110 | 1.6300 |
| (4) | $\theta n$ | 0.2618 | 0.2618 | 0.1833 |
| (5) | $(\pi/2) - (2 \times \theta m + \theta n)$ | 0.0000 | 0.0000 | 0.0785 |
| (6) | $(\pi/2) - (\theta l + \theta m + \theta n)$ | 0.0000 | 0.0000 | −0.0087 |
| (7) | $2 \times H2/\alpha\tau$ | $\alpha = 2, \tau = 3$: 0.2652 | $\alpha = 3, \tau = 4$: 0.2773 | $\alpha = 2, \tau = 3$: 0.3389<br>$\alpha = 4, \tau = 5$: 0.2440 |

From data described above, it is understood that all of the head-up displays of Examples 1 to 3 are a head-up display which satisfies the conditional expressions (1) to (7), and achieves reduction in size while securing the optical path length from the image display element to the image reflecting surface.

Although the invention has been described in connection with the embodiment and the examples, the invention is not limited to the embodiment and the examples described above, and various modifications may be made. For example, the positions and the sizes of the image display element, each mirror, the light source, and the like are not limited to the values in the respective numerical examples described above, and may take other values.

What is claimed is:

1. A head-up display comprising:
a reflection optical system which reflects display light from an image display element to an observer side on an image reflecting surface facing the observer, an image displayed on the image display element being enlarged and displayed as a virtual image over the image reflecting surface,
wherein the reflection optical system has at least three or more mirrors including an l-th mirror, an m-th mirror, and an n-th mirror sequentially in this order from the image display element side along a light beam emitted from the image display element, and the n-th mirror has a refractive power and is arranged closest to the image reflecting surface side along an optical path of the light beam among all mirrors,
the light beam emitted from the image display element is reflected from the l-th mirror, the m-th mirror, and the n-th mirror in this order, and the light beam emitted from the n-th mirror passes between the l-th mirror and the m-th mirror and reaches the image reflecting surface, and
conditional expressions (1) to (6) are satisfied, $$0.18 < \beta \times H1/\alpha m < 0.33 \tag{1}$$

$$3.50 < \alpha m/(\alpha n \times \sin\theta n) < 5.00 \tag{2}$$

$$1.00 < \alpha m/(L^2 - (\alpha n \times \cos\theta n)^2)^{1/2} < 2.00 \tag{3}$$

$$\pi/36 < \theta n < \pi/9 \tag{4}$$

$$-\pi/15 < (\pi/2) - (2 \times \theta m + \theta n) < \pi/15 \tag{5}$$

$$-\pi/15 < (\pi/2) - (\theta l + \theta m + \theta n) < \pi/15 \tag{6}$$

in the conditional expressions, when a light beam emitted from a central position of the image display element in a direction perpendicular to a display surface of the image display element is a central light beam, an intersection point of the central light beam and the l-th mirror is Pl, an intersection point of the central light beam and the m-th mirror is Pm, an intersection point of the central light beam and the n-th mirror is Pn, and a plane including the intersection point Pl, the intersection point Pm, and the intersection point Pn is U, β: a paraxial magnification of the n-th mirror H1: the distance between the center and the end of a display region of the image display element in the plane U αm: the distance between the intersection point Pl and the intersection point Pm αn: the distance between the intersection point Pm and the intersection point Pn θl: an incidence angle or a reflection angle of the central light beam at the intersection point Pl θm: an incidence angle or a reflection angle of the central light beam at the intersection point Pm θn: an incidence angle or a reflection angle of the central light beam at the intersection point Pn L: the distance between the intersection point Pl and the intersection point Pn.

2. The head-up display according to claim 1, further comprising:
a diffusion member which diffuses and projects the light beam emitted from the image display element, the light beam emitted from the image display element being projected onto the image reflecting surface through the diffusion member,
wherein the light beam emitted from the image display element passes through two adjacent mirrors from the image display element to the n-th mirror along the light beam emitted from the image display element, and
a conditional expression (7) is satisfied, $$0.20 < 2 \times H2/\alpha\tau < 0.40 \tag{7}$$

in the conditional expression, when the two adjacent mirrors are a σ-th mirror and a τ-th mirror in this order from the image display element side, an intersection point of the central light beam and the σ-th mirror is Pσ, and an intersection point of the central light beam and the τ-th mirror is Pτ, H2: the distance between the center and the end of a display region of the diffusion member in the plane U ατ: the distance between the intersection point Pσ and the intersection point Pτ.

3. The head-up display according to claim 1, wherein at least one of conditional expressions (1-1) to (6-1) is satisfied.

$$0.21 < \beta \times H1/\alpha m < 0.32 \tag{1-1}$$

$$3.80 < \alpha m/(\alpha n \times \sin\theta n) < 4.50 \tag{2-1}$$

$$1.20 < \alpha m/(L^2 - (\alpha n \times \cos\theta n)^2)^{1/2} < 1.80 \tag{3-1}$$

$$\pi/22 < \theta n < \pi/10 \tag{4-1}$$

$-\pi/18 < (\pi/2)-(2\times\theta m+\theta n) < \pi/18$ (5-1)

$-\pi/18 < (\pi/2)-(\theta l+\theta m+\theta n) < \pi/18$ (6-1).

4. The head-up display according to claim 1, wherein at least one of conditional expressions (1-2) to (6-2) is satisfied.

$0.22 < \beta \times H1/\alpha m < 0.30$ (1-2)

$3.90 < \alpha m/(\alpha n \times \sin\theta n) < 4.30$ (2-2)

$1.25 < \alpha m/(L^2-(\alpha n \times \cos\theta n)^2)^{1/2} < 1.70$ (3-2)

$\pi/20 < \theta n < \pi/11$ (4-2)

$-\pi/22 < (\pi/2)-(2\times\theta m+\theta n) < \pi/22$ (5-2)

$-\pi/22 < (\pi/2)-(\theta l+\theta m+\theta n) < \pi/22$ (6-2).

5. The head-up display according to claim 2, wherein a conditional expression (7-1) is satisfied.

$0.22 < 2 \times H2/\alpha\tau < 0.38$ (7-1).

6. The head-up display according to claim 2, wherein a conditional expression (7-2) is satisfied.

$0.24 < 2 \times H2/\alpha\tau < 0.36$ (7-2).

* * * * *